US012759854B2

(12) United States Patent
Reges et al.

(10) Patent No.: US 12,759,854 B2
(45) Date of Patent: Oct. 13, 2026

(54) BOOM ASSEMBLY HAVING AN ADAPTER

(71) Applicant: Crown Equipment Corporation, New Bremen, OH (US)

(72) Inventors: Clinton Reges, Greenville, NC (US); John Tinker, Greenville, NC (US); Derek Vermeulen, La Grange, NC (US)

(73) Assignee: Crown Equipment Corporation, New Bremen, OH (US)

( * ) Notice: Subject to any disclaimer, the term of this patent is extended or adjusted under 35 U.S.C. 154(b) by 182 days.

(21) Appl. No.: 18/733,093

(22) Filed: Jun. 4, 2024

(65) Prior Publication Data

US 2024/0409381 A1 Dec. 12, 2024

Related U.S. Application Data

(60) Provisional application No. 63/578,672, filed on Aug. 25, 2023, provisional application No. 63/578,769,
(Continued)

(51) Int. Cl.

| | |
|---|---|
| ***B66F 17/00*** | (2006.01) |
| ***B66F 9/075*** | (2006.01) |
| ***G01M 5/00*** | (2006.01) |

(52) U.S. Cl.

CPC ........ *B66F 17/003* (2013.01); *B66F 9/07504* (2013.01); *B66F 9/0755* (2013.01); *G01M 5/0025* (2013.01); *G01M 5/0041* (2013.01)

(58) Field of Classification Search

CPC ...... B66F 17/00; B66F 17/003; B66F 17/006; B66F 9/07545; B66F 9/0759; B66F 9/08; B66F 9/20
(Continued)

(56) References Cited

U.S. PATENT DOCUMENTS

| | | | |
|---|---|---|---|
| 1,335,302 | A | 3/1920 | Stout |
| 3,912,404 | A | 10/1975 | Katt |

(Continued)

FOREIGN PATENT DOCUMENTS

| | | | |
|---|---|---|---|
| CA | 2690790 | C | 6/2013 |
| CA | 3014117 | A1 | 2/2020 |

(Continued)

OTHER PUBLICATIONS

McPherson, James M; Notice of Allowance and Fee(s) Due dated Oct. 16, 2025; U.S. Appl. No. 18/733,363; United States Patent and Trademark Office; Alexandria, Virginia.

(Continued)

*Primary Examiner* — Christopher M Koehler
(74) *Attorney, Agent, or Firm* — Stevens & Showalter LLP

(57) ABSTRACT

A boom assembly including an upper boom portion, a base mount, and an adapter coupling the base mount to the upper boom portion, in which the adapter is configured to (i) maintain the boom assembly in a normal operating position when the upper boom portion is subjected to one or more external forces causing one or more internal forces in the adapter below a yield force threshold of the adapter; and (ii) yield when the upper boom portion is subjected to one or more external forces causing one or more internal forces in the adapter equal to or in excess of the yield force threshold of the adapter. Also provided is a materials handling vehicle including a boom assembly.

17 Claims, 16 Drawing Sheets

Related U.S. Application Data filed on Aug. 25, 2023, provisional application No. 63/506,894, filed on Jun. 8, 2023.

(58) Field of Classification Search
USPC ........................................................ 403/2, 145
See application file for complete search history.

(56) References Cited

U.S. PATENT DOCUMENTS

| | | | | |
|---|---|---|---|---|
| 4,236,843 | A | 12/1980 | Chisholm | |
| 4,619,219 | A | 10/1986 | Millard | |
| 5,205,236 | A | 4/1993 | Hughes | |
| 5,214,886 | A | 6/1993 | Hugron | |
| 5,487,522 | A | 1/1996 | Hook | |
| 5,820,097 | A | 10/1998 | Spooner | |
| 5,884,432 | A | 3/1999 | DeLillo | |
| 6,059,201 | A | 5/2000 | Weddle | |
| 6,195,605 | B1 | 2/2001 | Tabler et al. | |
| 6,216,413 | B1 | 4/2001 | Lapointe | |
| 6,267,529 | B1 | 7/2001 | Mudryk et al. | |
| 7,473,051 | B2 * | 1/2009 | Audet | E01F 9/629 40/608 |
| 8,002,493 | B2 | 8/2011 | Audet | |
| 8,434,921 | B2 | 5/2013 | Sherwin | |
| 8,506,142 | B2 * | 8/2013 | Macke | B60Q 1/0491 362/382 |
| 9,268,201 | B1 | 2/2016 | Montgomery | |
| 9,410,659 | B2 | 8/2016 | Troy et al. | |
| 9,509,889 | B2 | 11/2016 | Reid | |
| 9,527,385 | B2 | 12/2016 | Lee | |
| 10,061,184 | B2 | 8/2018 | Harden | |
| 10,340,095 | B2 | 7/2019 | Haake et al. | |
| 10,510,262 | B1 | 12/2019 | Kim | |
| 11,167,713 | B2 | 11/2021 | Robertson | |
| 11,225,404 | B2 | 1/2022 | Harshbarger et al. | |
| 11,459,713 | B2 | 10/2022 | Evans et al. | |
| 11,560,678 | B2 | 1/2023 | Llobet | |
| 12,358,763 | B2 | 7/2025 | Schoonmaker et al. | |
| 2005/0036833 | A1 | 2/2005 | Hotchkin | |
| 2005/0196235 | A1 | 9/2005 | Strick | |
| 2006/0220872 | A1 | 10/2006 | Brown et al. | |
| 2006/0228165 | A1 * | 10/2006 | Yonan | E01F 9/638 403/2 |
| 2013/0144488 | A1 | 6/2013 | Schofield et al. | |
| 2020/0068805 | A1 | 3/2020 | Hanson et al. | |
| 2020/0324700 | A1 | 10/2020 | Asfaw | |
| 2022/0176893 | A1 | 6/2022 | Pape | |
| 2024/0335851 | A1 | 10/2024 | Ruppert et al. | |

FOREIGN PATENT DOCUMENTS

| | | | |
|---|---|---|---|
| CN | 206511882 | U | 9/2017 |
| CN | 107601359 | A | 1/2018 |
| CN | 208716759 | U | 4/2019 |
| CN | 215160702 | U | 12/2021 |
| CN | 216892130 | U | 7/2022 |
| CN | 116442915 | A | 7/2023 |
| DE | 2355069 | A1 | 5/1975 |
| DE | 19720084 | A1 | 11/1998 |
| DE | 19745923 | A1 | 4/1999 |
| EP | 2987760 | B1 | 4/2019 |
| EP | 3617007 | A1 | 3/2020 |
| EP | 3670428 | A1 | 6/2020 |
| FR | 2748462 | A1 | 11/1997 |
| GB | 417422 | A | 10/1934 |
| GB | 2058890 | A | 4/1981 |
| JP | 3027223 | U | 8/1996 |
| JP | 3369128 | B2 | 1/2003 |
| KR | 101103716 | B1 | 1/2012 |
| KR | 101600292 | B1 | 3/2016 |
| KR | 102012705 | B1 | 8/2019 |
| WO | 2004069568 | A1 | 8/2004 |

OTHER PUBLICATIONS

Information pertaining to disclosure of the claimed invention by the applicant and invoking the 1-year grace period as set forth in the Information Disclosure Statement Cover Letter mailed together with the present Information Disclosure Statement dated Oct. 17, 2024.

https://optimizedorderpicking.com/en/; 2024; SAT Technologies.

Reges, Clinton; Related U.S. Appl. No. 18/733,161; entitled Boom Assembly Having an Adapter; filed Jun. 4, 2024; United States Patent and Trademark Office; Alexandria, Virginia.

Reges, Clinton; Related U.S. Appl. No. 18/733,363; entitled Integrity Monitoring System for a Boom Assembly; filed Jun. 4, 2024; United States Patent and Trademark Office; Alexandria, Virginia.

Serafeim, Athanasios; Extended European Search Report dated Feb. 25, 2025; European Application No. 24199096.9; European Patent Office; Munich, Germany.

Reges, Clinton et al.; Related U.S. Continuation U.S. Appl. No. 19/754,492, filed Jul. 27, 2026 entitled "Boom Assembly Having an Adapter" United States Patent and Trademark Office; Alexandria, Virginia.

* cited by examiner

BOOM ASSEMBLY HAVING AN ADAPTER

RELATED APPLICATIONS

This application claims the benefit of U.S. Provisional Application No. 63/506,894, filed Jun. 8, 2023, entitled "BOOM ASSEMBLY HAVING AN ADAPTER"; U.S. Provisional Application No. 63/578,672, filed Aug. 25, 2023, entitled "BOOM ASSEMBLY HAVING AN ADAPTER"; and U.S. Provisional Application No. 63/578,769, filed Aug. 25, 2023, entitled "INTEGRITY MONITORING SYSTEM FOR A BOOM ASSEMBLY", the disclosures of which are herein incorporated by reference in their entirety.

TECHNICAL FIELD

The present disclosure relates to a boom assembly having an adapter and more specifically to a boom assembly having a yielding adapter that allows for controlled failure of the boom assembly.

BACKGROUND

A boom assembly may be used to position an accessory such as a camera at a desired vertical and/or horizontal position. Because the boom assembly extends outward from the surface to which it is mounted, the boom assembly may be subjected to a variety of forces, particularly collisions with other objects, which may cause the boom assembly to fully or partially collapse or deflect.

SUMMARY

In accordance with a first aspect of the present disclosure, a boom assembly is provided, the boom assembly including: an upper boom portion; a base mount; and an adapter coupling the base mount to the upper boom portion, in which the adapter is configured to (i) maintain the boom assembly in a normal operating position when the upper boom portion is subjected to one or more external forces causing one or more internal forces in the adapter below a yield force threshold of the adapter; and (ii) yield when the upper boom portion is subjected to one or more external forces causing one or more internal forces in the adapter equal to or in excess of the yield force threshold of the adapter.

The adapter may include an upper element coupled to the upper boom portion, and a lower element coupled to the base mount. The adapter may further include a first shear pin, and a second shear pin, in which: when the upper boom portion is subjected to one or more external forces having a force component extending in a first direction causing one or more internal forces in the adapter equal to or in excess of the yield force threshold, the first shear pin may break and allow the upper element to rotate in a first bending direction, and when the upper boom portion is subjected to one or more external forces having a force component extending in a second direction opposite to the first direction causing one or more internal forces in the adapter equal to or in excess of the yield force threshold, the second shear pin may break and allow the upper element to rotate in a second bending direction. The adapter may be configured such that the upper boom portion remains connected to the base mount after the first shear pin fails or the second shear pin fails.

The upper element may include a first extension and a second extension, and the adapter may further include: a first arm and a second arm; a first gas spring, in which a first end of the first gas spring is coupled to the first extension and a second end of the first gas spring is coupled to a first end of the first arm; and a second gas spring, in which a first end of the second gas spring is coupled to the second extension and a second end of the second gas spring is coupled to a first end of the second arm. When the upper boom portion is subjected to one or more external forces having a force component extending in a first direction causing one or more internal forces in the adapter equal to or in excess of the yield force threshold, the first gas spring may provide resistance to rotation of the upper element in a first bending direction, and when the upper boom portion is subjected to one or more external forces having a force component extending in a second direction causing one or more internal forces in the adapter equal to or in excess of the yield force threshold, the second gas spring may provide resistance to rotation of the upper element in a second bending direction. The upper element may further include a first stop and a second stop, in which a linear section of the first arm rests against the first stop and a linear section of the second arm rests against the second stop when the boom assembly is in the normal operating position.

The upper element may include a pair of upper engagement plates that are received in an upper support body, in which the upper engagement plates may be configured to be received in the upper boom portion to secure the upper boom portion to the upper element. The lower element may include a pair of lower engagement plates that are received in a lower support body, in which the lower engagement plates may be configured to be received in the base mount to secure the lower element to the base mount.

In accordance with a second aspect of the present disclosure, a materials handling vehicle is provided, the vehicle including: a power unit; a load handling assembly extending from the power unit and including a pair of forks; an operator's station including an operator's backrest and an operator's platform; and a boom assembly associated with the materials handling vehicle, in which the boom assembly includes a base mount, an upper boom portion, and an adapter coupling the base mount to the upper boom portion. The base mount includes a main body extending generally vertically above the operator's platform, and the upper boom portion includes a first section extending generally vertically above the operator's platform. The adapter is configured to (i) maintain the boom assembly in a normal operating position when the upper boom portion is subjected to one or more external forces causing one or more internal forces in the adapter below a yield force threshold of the adapter; and (ii) yield when the upper boom portion is subjected to one or more external forces causing one or more internal forces in the adapter equal to or in excess of the yield force threshold of the adapter The adapter may further include an upper element coupled to the upper boom portion, and a lower element coupled to the base mount. The adapter may further include a first shear pin, and a second shear pin, in which: when the upper boom portion is subjected to one or more external forces having a force component extending in a first direction causing one or more internal forces in the adapter equal to or in excess of the yield force threshold, the first shear pin may break and allow the upper element to rotate in a first bending direction, and when the upper boom portion is subjected to one or more external forces having a force component extending in a second direction causing one or more internal forces in the adapter equal to or in excess of the yield force threshold, the second shear pin may break and allow the upper element to rotate in a second bending direction. The adapter may be configured such that the upper boom portion remains connected to the base mount after the first shear pin fails or the second shear pin fails.

The upper element may include a first extension and a second extension, and the adapter may further include: a first arm and a second arm; a first gas spring, in which a first end of the first gas spring is coupled to the first extension and a second end of the first gas spring is coupled to a first end of the first arm; and a second gas spring, in which a first end of the second gas spring is coupled to the second extension and a second end of the second gas spring is coupled to a first end of the second arm. When the upper boom portion is subjected to one or more external forces having a force component extending in a first direction causing one or more internal forces in the adapter equal to or in excess of the yield force threshold, the first gas spring may provide resistance to rotation of the upper element in a first bending direction, and when the upper boom portion is subjected to one or more external forces having a force component extending in a second direction causing one or more internal forces in the adapter equal to or in excess of the yield force threshold, the second gas spring may provide resistance to rotation of the upper element in a second bending direction.

A length of the main body of the base mount may be configured so that a junction between the upper and lower elements of the adapter is located a first height above the operator's platform, in which the first height is greater than an operator height for a 95th percentile adult male.

The vehicle may further include an accessory coupled to a distal end of the upper boom portion. The upper boom portion may further include a second section extending over the forks perpendicular to the first section, and a length of the second section of the upper boom portion may be configured to position the accessory over the forks. The accessory may include a camera.

The boom assembly may be coupled to the operator's backrest.

DETAILED DESCRIPTION

Figure 1:
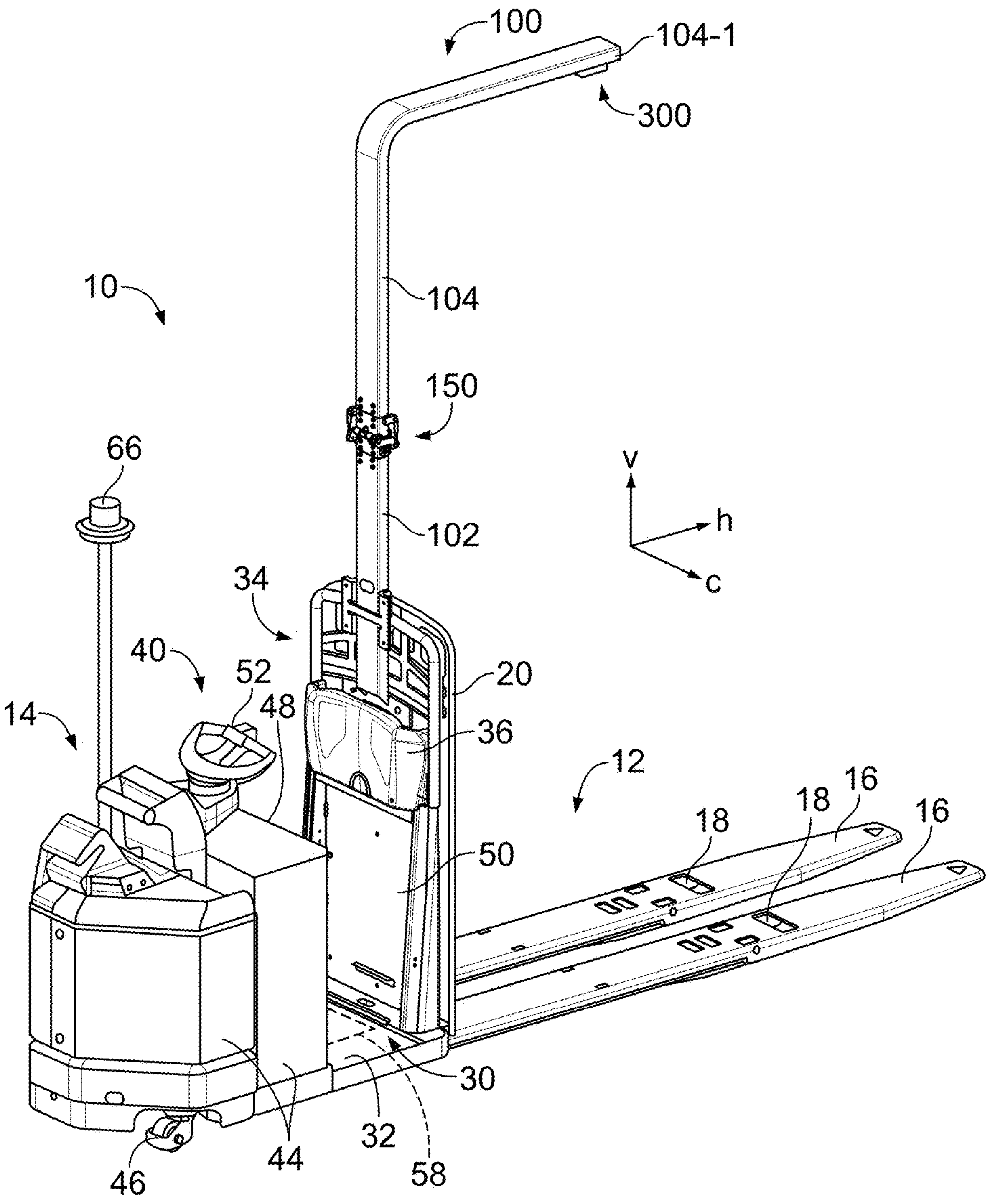
FIG. 1 is a perspective view of a materials handling vehicle comprising a boom assembly with an adapter in accordance with the present disclosure.
Figure 14:
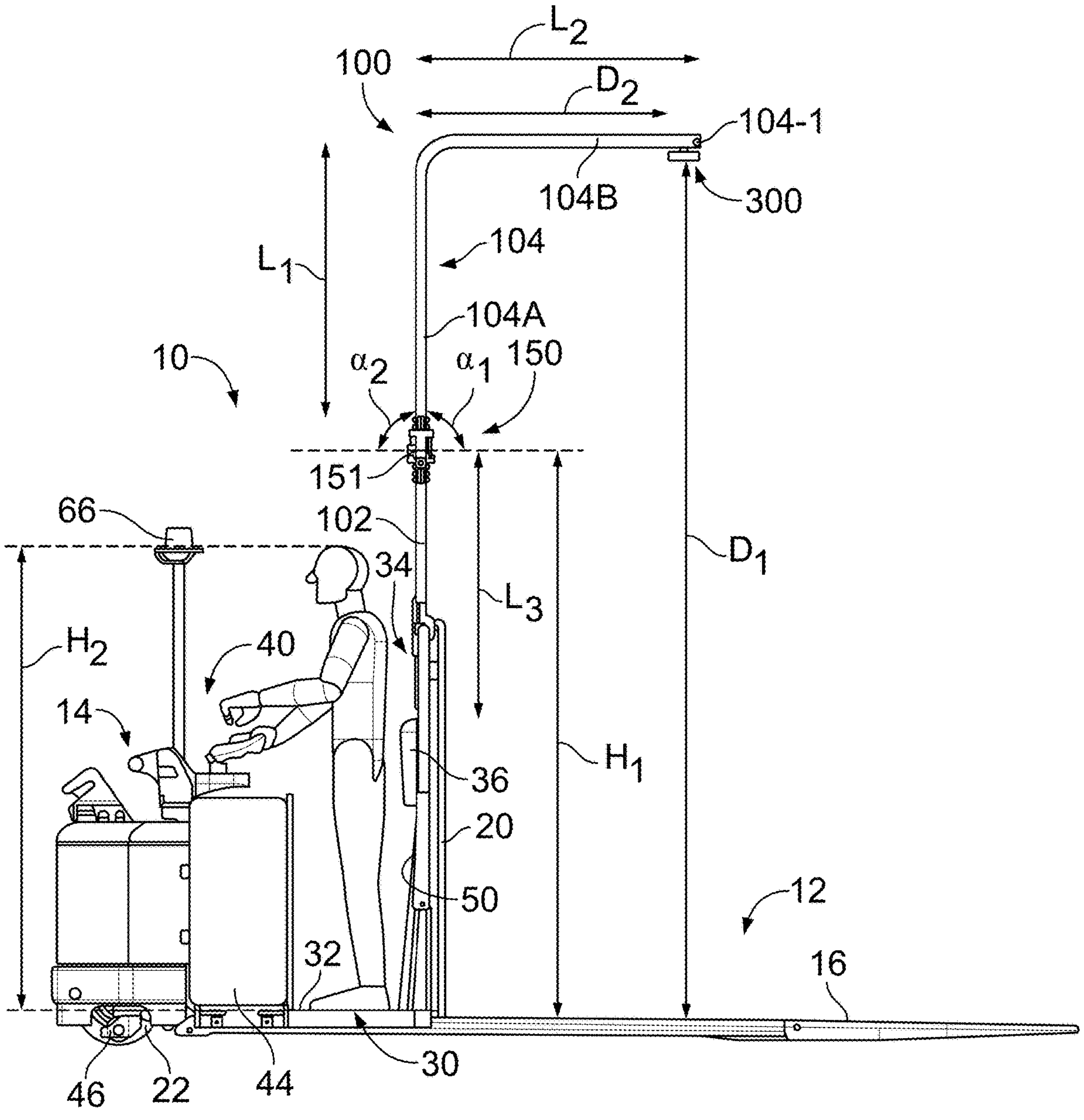
FIGS. 14-16 are side views of a materials handling vehicle comprising a boom assembly with an adapter in accordance with the present disclosure.

A materials handling vehicle constructed in accordance with the present disclosure is shown in FIGS. 1 and 14. The materials handling vehicle is depicted as a low level order picking truck 10 that includes a load handling assembly 12 extending from a power unit 14. The load handling assembly 12 includes a pair of forks 16, each fork 16 having a load supporting wheel assembly 18. The load handling assembly 12 may include other load handling features in addition to, or in lieu of, the illustrated arrangement of the forks 16, such as scissors-type elevating forks, outriggers, or separate height adjustable forks. Still further, the load handling assembly 12 may include load handling features such as a mast, a load platform, collection cage, or other support structure carried by the forks 16 or otherwise provided for handling a load supported and carried by the truck 10 or pushed or pulled by the truck 10, i.e., such as by a tugger vehicle. A compartment 44 may contain a battery, control electronics, and motor(s) (not shown), such as a traction motor/brake assembly, steer motor, and/or lift motor for the forks 16. The traction motor/brake assembly may be coupled to a steerable drive wheel 22 for driving and braking the drive wheel 22. First and second caster wheels (only the first caster wheel 46 is illustrated) are coupled to opposing sides of the power unit 14.

The illustrated power unit 14 comprises a step-through operator's station 30 defined by an operator's backrest 34, a side wall 48 of the compartment 44, and a floorboard or operator's platform 32. The operator may stand on the operator's platform 32 to drive the truck 10 (see FIG. 14), and/or the operator's platform 32 may provide a position from which the operator may operate the various included features of the truck 10. When the operator is standing on the operator's platform 32, a control area 40 provides for driving the truck 10 and for controlling the features of the load handling assembly 12.

With reference to FIG. 1, as shown for purposes of illustration, and not by way of limitation, the control area 40 comprises a handle 52 for steering the truck 10, which may include controls such as grips, butterfly switches, thumbwheels, rocker switches, a hand wheel, a steering tiller, etc., for controlling the acceleration/braking and travel direction of the truck 10. For example, as shown, a control such as a switch grip (not labeled) may be provided on the handle 52, which is spring biased to a center neutral position. Rotating the switch grip forward and upward will cause the truck 10 to move forward, e.g., power unit first, at an acceleration proportional to the amount of rotation of the switch grip until the truck 10 reaches a predefined maximum speed, at which point the truck 10 is no longer permitted to accelerate to a higher speed. For example, if the switch grip is very quickly rotated 50% of a maximum angle of rotation capable for the grip, the truck 10 will accelerate at approximately 50% of the maximum acceleration capable for the truck 10 until the truck 10 reaches 50% of the maximum speed capable for the truck 10. It is also contemplated that acceleration may be determined using an acceleration map stored in memory where the rotation angle of the grip is used as an input into and has a corresponding acceleration value in the acceleration map. The acceleration values in the acceleration map corresponding to the grip rotation angles may be proportional to the grip rotation angles or vary in any desired manner. There may also be a velocity map stored in memory where the rotation angle of the grip is used as an input into and has a corresponding maximum velocity value stored in the velocity map. For example, when the grip is rotated 50% of the maximum angle capable for the grip, the truck 10 will accelerate at a corresponding acceleration value stored in the acceleration map to a maximum velocity value stored in the velocity map corresponding to the grip angle of 50% of the maximum angle. Similarly, rotating the switch grip downward and toward the rear of the truck 10 will cause the truck 10 to move in reverse, e.g., forks first, at an acceleration proportional to the amount of rotation of the switch grip until the truck 10 reaches a predefined maximum speed, at which point the truck 10 is no longer permitted to accelerate to a higher speed.

One or more proximity or presence sensors 58 may be provided to detect the presence of an operator on the truck 10. For example, presence sensor(s) 58 may be located on, above, or under a floor of the operator's platform 32, or otherwise provided about the operator's station 30. In the exemplary truck 10 of FIG. 1, the presence sensor(s) 58 is/are shown in dashed lines indicating that it/they is/are positioned under the floor of the operator's platform 32. Under this arrangement, the presence sensor(s) 58 may comprise load sensors, switches, etc. As an alternative (not shown), the presence sensor(s) 58 may be implemented above the floor of the operator's platform 32, such as by using ultrasonic, capacitive, or other suitable sensing technology. The presence sensor 58 generates an operator status signal indicating that either an operator is standing on the operator's platform 32 in the operator's station 30 or no operator is standing on the operator's platform 32 in the operator's station 30. A change in the operator status signal indicates that an operator has either entered or exited the operator's station 30.

With continued reference to FIGS. 1 and 14, an antenna 66 extends vertically from the power unit 14 and is provided for receiving control signals from a corresponding wireless remote control device (not shown). It is also contemplated that the antenna 66 may be provided within the compartment 44 of the power unit 14 or elsewhere on the truck 10. The remote control device may comprise a transmitter that is worn or otherwise maintained by the operator. The remote control device is manually operable by an operator, e.g., by pressing a button or other control, to cause the remote control device to wirelessly transmit at least a first type of signal designating a travel request to the truck 10. The travel request is a command that requests the corresponding truck 10 to travel by a predetermined amount.

The truck 10 may also comprise one or more obstacle sensors (not shown), which are provided about the truck 10, e.g., towards a front end of the power unit 14 and/or to the sides of the power unit 14. The obstacle sensor(s) may include at least one contactless obstacle sensor on the truck 10 and may be operable to define at least one detection zone. The obstacle sensor(s) may comprise any suitable proximity detection technology, such as one or more ultrasonic sensors, optical recognition devices, infrared sensors, laser scanner sensors, etc., which may be capable of detecting the presence of objects/obstacles or may be capable of generating signals that can be analyzed to detect the presence of objects/obstacles within the predefined detection zone(s) of the power unit 14.

In practice, the truck 10 may be implemented in other formats, styles and features, such as an end control pallet truck that includes a steering tiller arm that is coupled to a tiller handle for steering the truck. Still further, the truck, remote control system, and/or components thereof, including the remote control device, may comprise any additional and/or alternative features or implementations, examples of which are disclosed in any one or more of the following commonly owned patents/published patent applications: U.S. Pat. No. 9,082,293, issued Jul. 14, 2015 entitled "SYSTEMS AND METHODS OF REMOTELY CONTROLLING A MATERIALS HANDLING VEHICLE"; U.S. Pat. No. 8,072,309, issued Dec. 6, 2011 entitled "SYSTEMS AND METHODS OF REMOTELY CONTROLLING A MATERIALS HANDLING VEHICLE"; U.S. Pat. No. 9,207,673, issued Dec. 8, 2015, entitled "FINGER-MOUNTED APPARATUS FOR REMOTELY CONTROLLING A MATERIALS HANDLING VEHICLE"; and/or U.S. Pat. No. 9,645,968, issued May 9, 2017, entitled "MULTIPLE ZONE SENSING FOR MATERIALS HANDLING VEHICLES"; the entire disclosures of which are each hereby incorporated by reference herein.

As shown in FIGS. 1 and 14, in the example shown, the truck 10 may comprise the operator's backrest 34 and a separate load backrest 20. The operator's backrest 34 faces toward the power unit 14 and is fixed to the operator's platform 32, such that the operator's backrest 34 does not move vertically relative to the operator's platform 32. The load backrest 20, which forms part of the load handling assembly 12 and may move vertically with the other components of the load handling assembly 12, faces toward the forks 16 and serves as a backstop for a load positioned on the forks 16. In other examples (not shown), the truck 10 may comprise a single backrest that serves as both the operator's backrest and the load backrest. The operator's backrest 34 may comprise a wall 50 extending generally vertically above the operator's platform 32 and a support pad 36 coupled to the wall 50. During operation of the truck 10, the operator may stand against the support pad 36.

A boom assembly 100 may be associated with, i.e., coupled to, the truck 10, and an accessory 300 may be coupled to the boom assembly 100. In the example shown in FIGS. 1 and 2, the boom assembly 100 is removably coupled to the operator's backrest 34, as described herein. In other examples (not shown), the boom assembly 100 may be welded or otherwise secured directly to the operator's backrest 34. In further examples (not shown), the boom assembly 100 may be offset from the operator's backrest 34 and may be secured to another component of the truck 10, such as the load handling assembly 12. The boom assembly 100 may extend above the operator's station 30 and over the forks 16, such that the accessory 300 is positioned above the forks 16. The accessory 300 may comprise, for example, a camera or other imaging device, a light detection and ranging (Lidar) device, a light or object/image projecting device, a sound emitting device, a wireless internet device, or any combination thereof.

Figure 2:
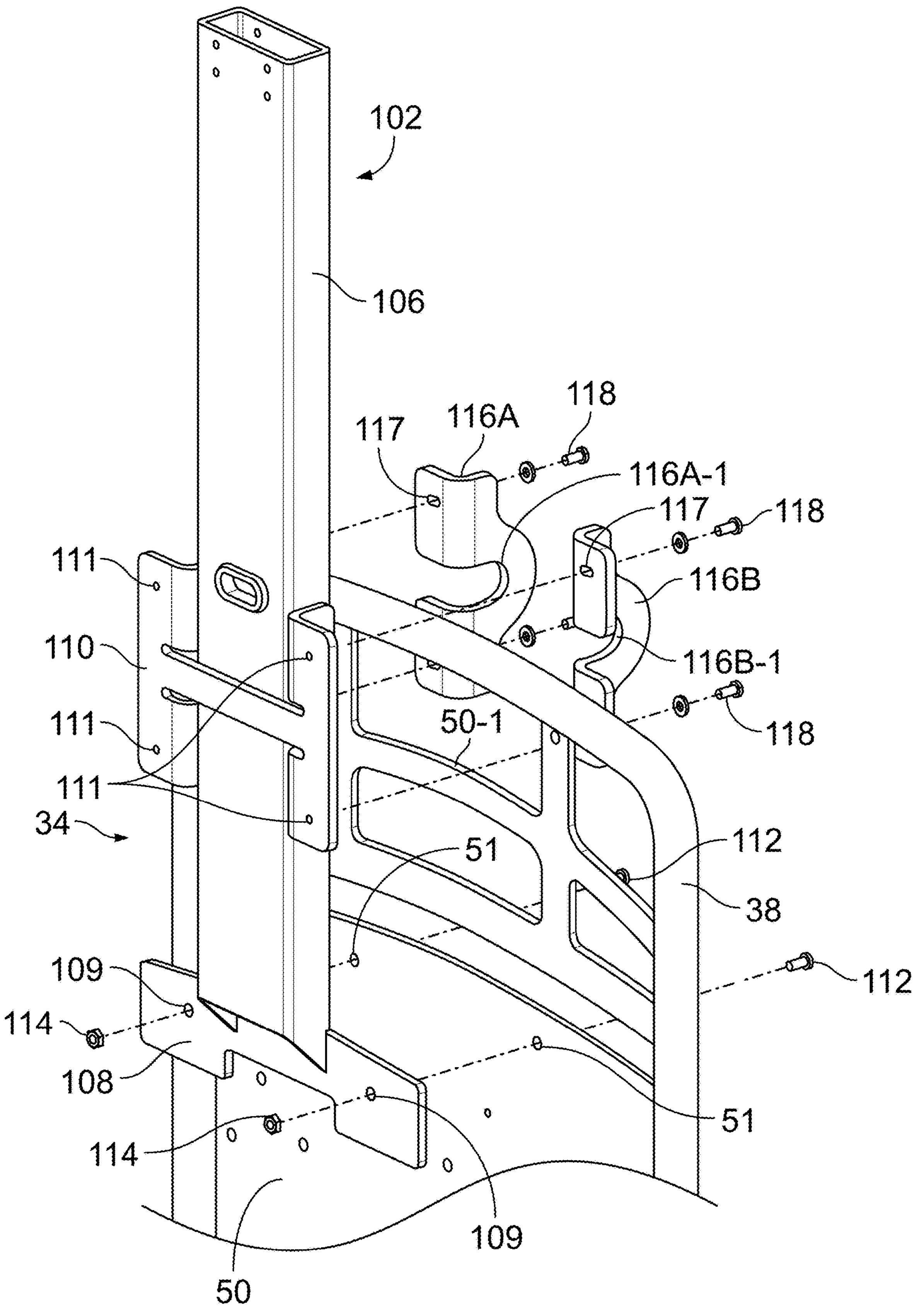
FIG. 2 is an exploded view of a portion of the boom assembly illustrated in FIG. 1.

With reference to FIGS. 1 and 2, the boom assembly 100 comprises a lower boom portion 102 (referred to herein as a base mount) and an upper boom portion 104. The base mount 102 is coupled to the upper boom portion 104 via an adapter 150 comprising a coupling that yields when the upper boom portion 104 is subjected to one or more external forces causing internal forces in the adapter 150 equal to or in excess of a yield force threshold of the adapter 150, as described herein.

As shown in FIG. 2, the base mount 102 may comprise a main body 106, a first flange 108, and a second flange 110, in which the first and second flanges 108, 110 are coupled and secured to the main body 106, e.g., via welding. In the example shown, the main body 106 is hollow and comprises a generally rectangular cross-section. In other examples, the main body 106 may comprise a different shape, such as a circular cross-sectional shape. The base mount 102 may be coupled to the operator's backrest 34 via the first and second flanges 108, 110. Fasteners 112 may extend through apertures 51 formed in the wall 50 of the operator's backrest 34 and through apertures 109 formed in the first flange 108 and may be secured, e.g., via nuts 114. First and second brackets 116A, 116B may be positioned opposite the second flange 110, e.g., between the operator's backrest 34 and the load backrest 20 (when present). The first and second brackets 116A, 116B may each comprise a respective notch 116A-1, 116B-1 that fits over and receives a bar 38 comprising an upper portion of the operator's backrest 34. Although not visible, a back side of the main body 106 may also comprise a notch that fits over and receives the bar 38. Fasteners 118 may extend through apertures 117 formed in the first and second brackets 116A, 116B and may be received in threaded apertures 111 formed in the second flange 110. Washers (not labeled) may be positioned between the fasteners 118 and the first and second brackets 116A, 116B. Upon assembly, an upper half (not labeled) of each of the first and second brackets 116A, 116B may extend above the bar 38, and a lower half (not labeled) of each of the first and second brackets 116A, 116B may extend below the bar 38 (see also FIG. 7). The wall 50 comprises at least one opening 50-1 through which the lower half of each of the first and second brackets 116A, 116B extends for coupling to the second flange 110. When the first and second brackets 116A, 116B are coupled to the second flange 110, the first and second brackets 116A, 116B may engage, i.e., physically contact, the second flange 110. Upon coupling of the first and second flanges 108, 110 to the operator's backrest 34, the base mount 102 is fixed to the operator's backrest 34, and the base mount 102, specifically the main body 106, extends generally vertically above the operator's platform 32, as shown in FIG. 1. The first and second flanges 108, 110 and the first and second brackets 116A, 116B help to stabilize the base mount 102 and the upper boom portion 104. The boom assembly 100 may be field installable and may be configured for retrofitting to the operator's backrest 34 of existing trucks via the first and second flanges 108, 110 and the first and second brackets 116A, 116B, as shown in FIGS. 1 and 2.

Figure 3:
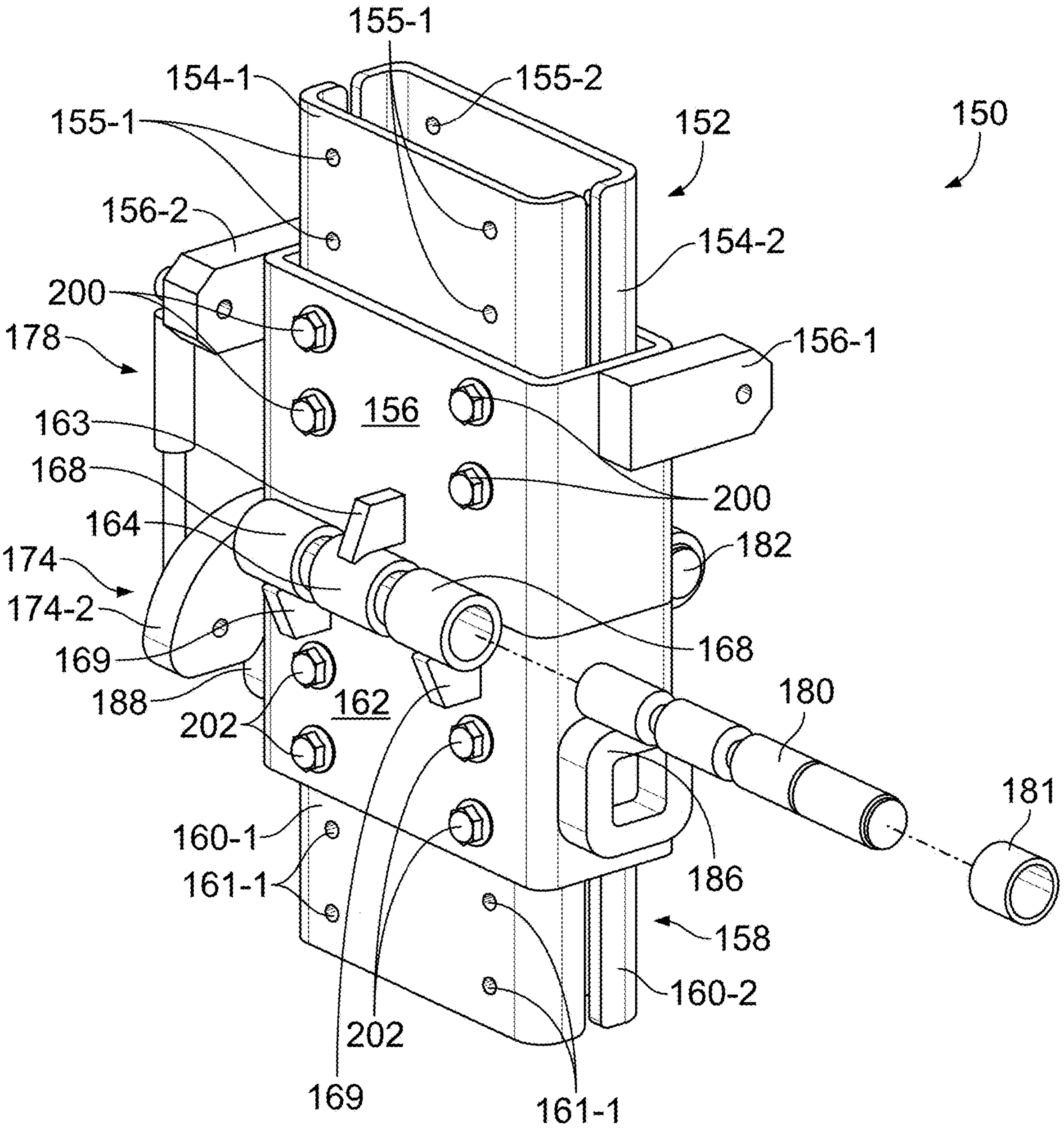
FIGS. 3 and 4 are partially exploded views of the adapter illustrated in FIG. 1.
Figure 4:
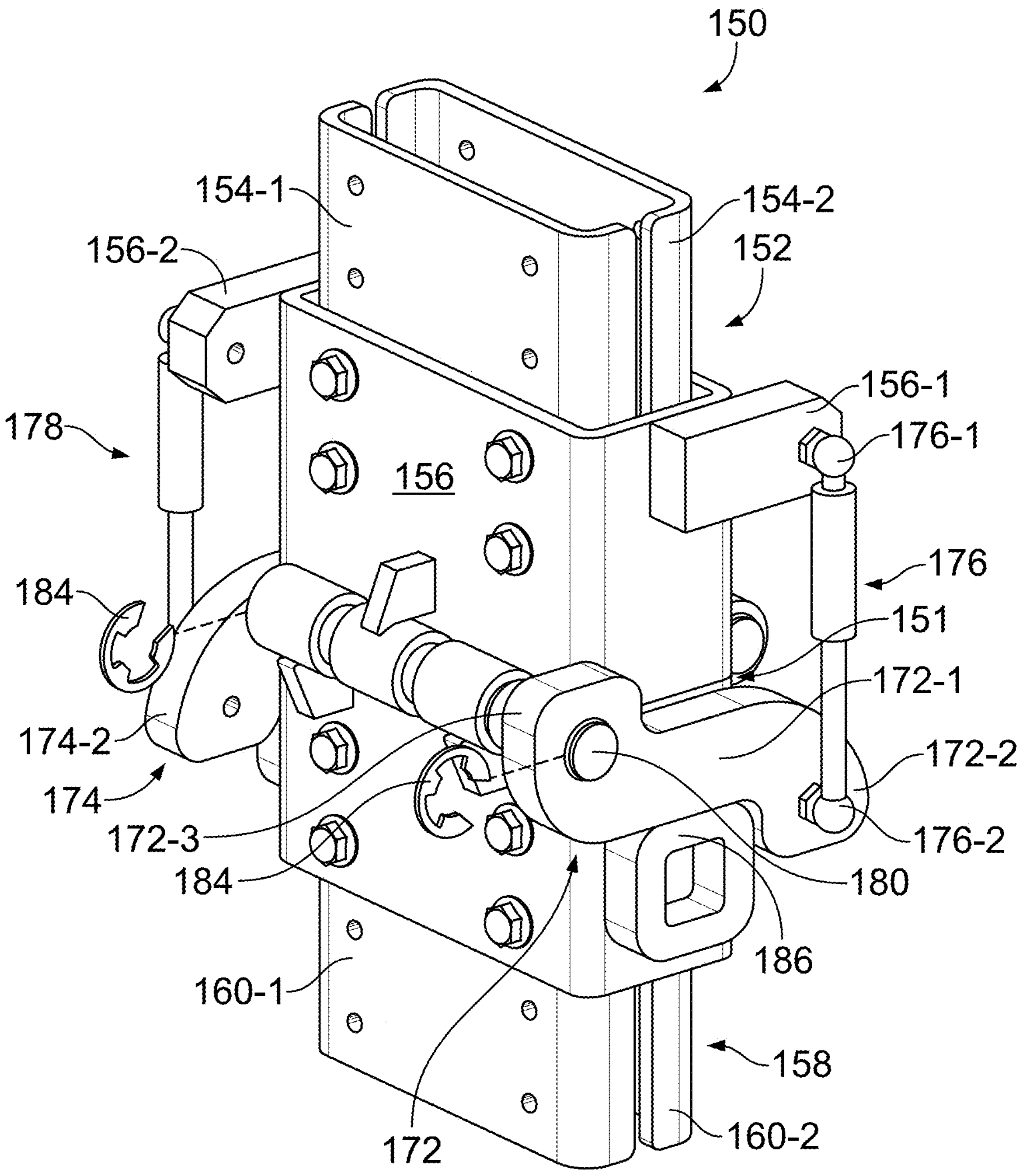

With reference to FIGS. 3 and 4, the adapter 150 comprises an upper element 152 that is coupled to the upper boom portion 104 (the upper boom portion 104 is not shown in FIGS. 3 and 4; see FIG. 7), a lower element 158 that is coupled to the base mount 102 (the base mount 102 is not shown in FIGS. 3 and 4; see FIG. 5), a first arm 172, a second arm 174, a first pin 180, a second pin 182, a first gas spring or first piston and cylinder unit or assembly 176, and a second gas spring or second piston and cylinder unit or assembly 178, in which the first and second gas springs 176, 178 may have a fluid in the cylinder such as a gas comprising air (in FIG. 3, the first arm 172 and the first gas spring 176 are omitted).

The upper element 152 comprises a pair of upper engagement plates 154-1, 154-2 that are received in an upper support body 156 and coupled to the upper support body 156 via fasteners 200. In the example shown in FIG. 3, four fasteners 200 extend through apertures (not visible) formed in a front side of the upper support body 156 and are received in threaded apertures (not visible) formed in the upper engagement plate 154-1 to secure the upper engagement plate 154-1 to the upper support body 156. Although not visible in FIG. 3, fasteners 200 also extend through apertures formed in a back side of the upper support body 156 and are received in threaded apertures formed in the upper engagement plate 154-2 to secure the upper engagement plate 154-2 to the upper support body 156 (see FIGS. 9 and 13B).

The lower element 158 comprises a pair of lower engagement plates 160-1, 160-2 that are received in a lower support body 162 and coupled to the lower support body 162 via fasteners 202. In the example shown in FIG. 3, four fasteners 202 extend through apertures (not visible) formed in a front side of the lower support body 162 and are received in threaded apertures (not visible) formed in the lower engagement plate 160-1 to secure the lower engagement plate 160-1 to the lower support body 162. Although not visible in FIG. 3, fasteners also extend through apertures formed in a back side of the lower support body 162 and are received in threaded apertures formed in the lower engagement plate 160-2 to secure the lower engagement plate 160-2 to the lower support body 162 (see FIGS. 9 and 13B).

Figure 11:
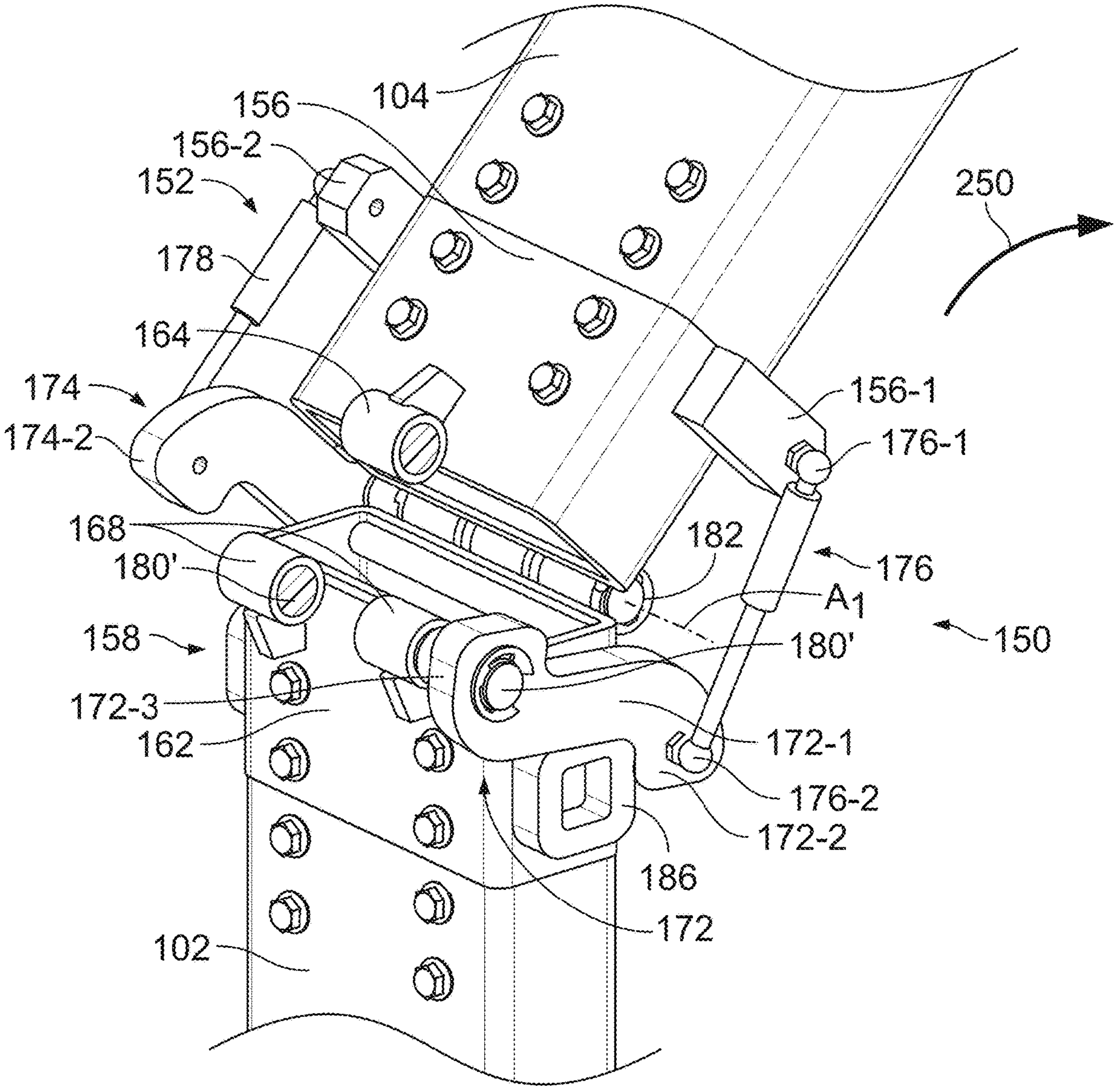
FIGS. 11 and 12 are detailed perspective views of the adapter illustrated in FIG. 10.
Figure 12:
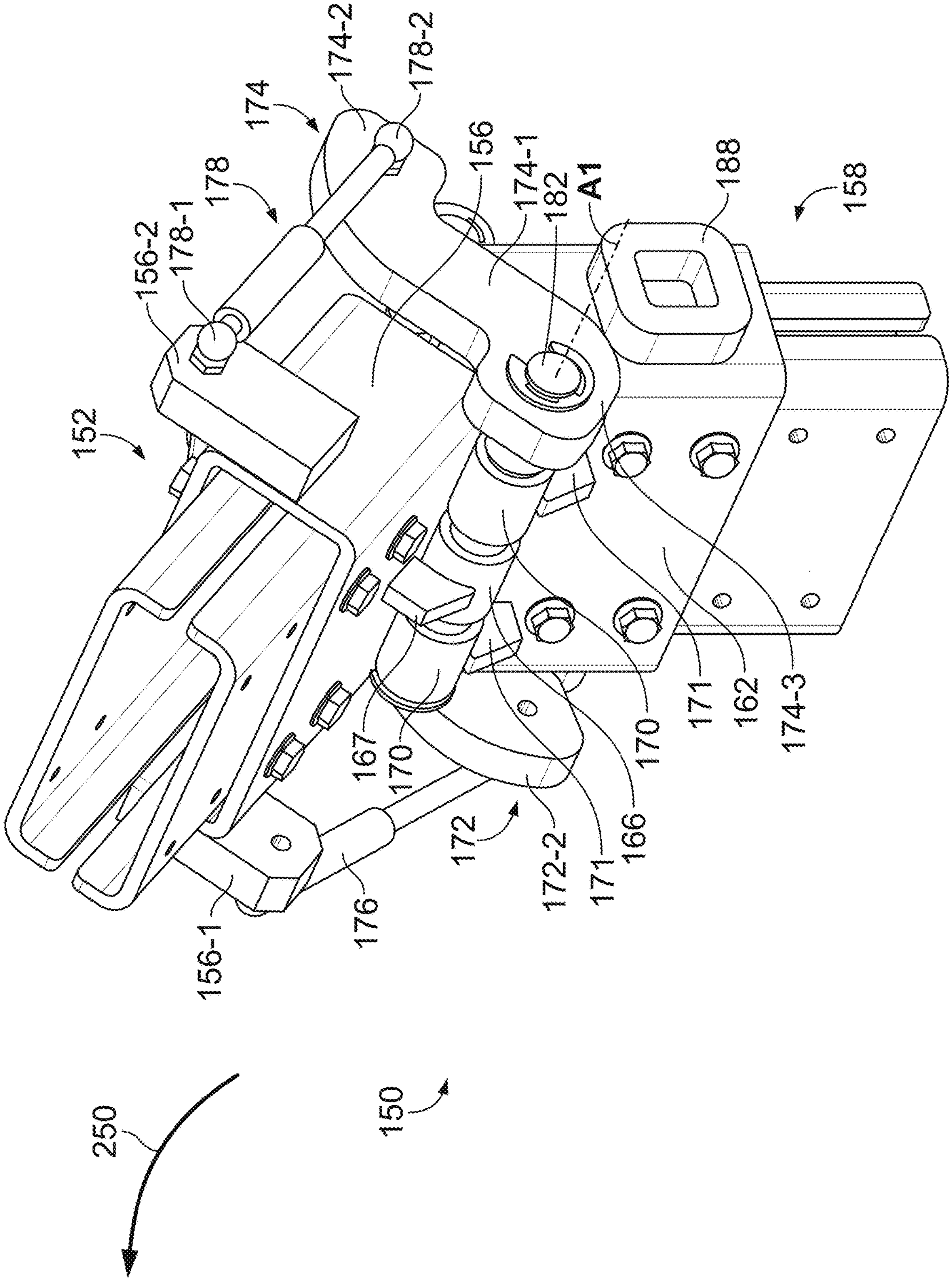
Figure 13A:
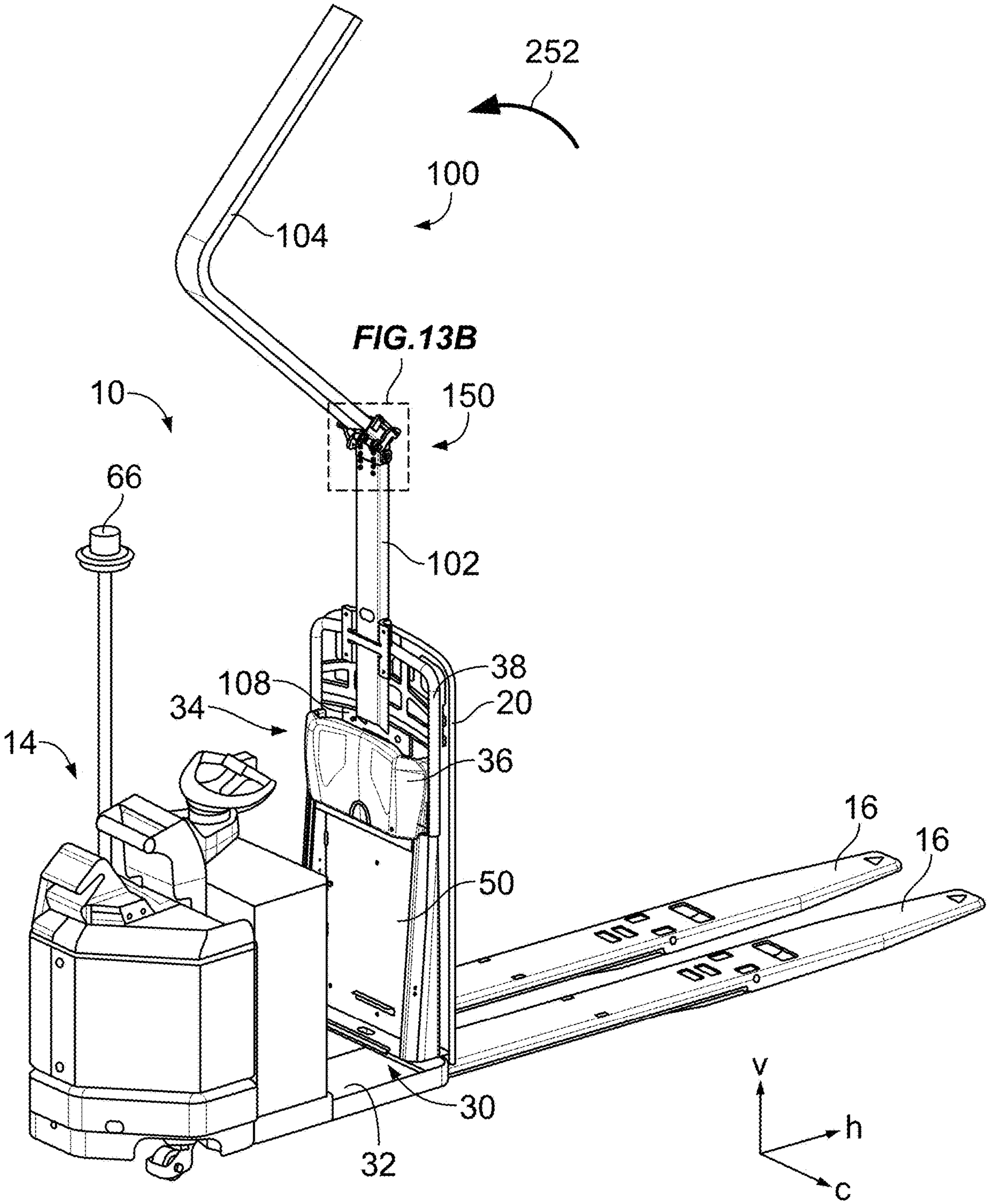
FIG. 13A is a perspective view of a materials handling vehicle comprising a boom assembly with an adapter in a second shear state, in accordance with the present disclosure.
Figure 13B:
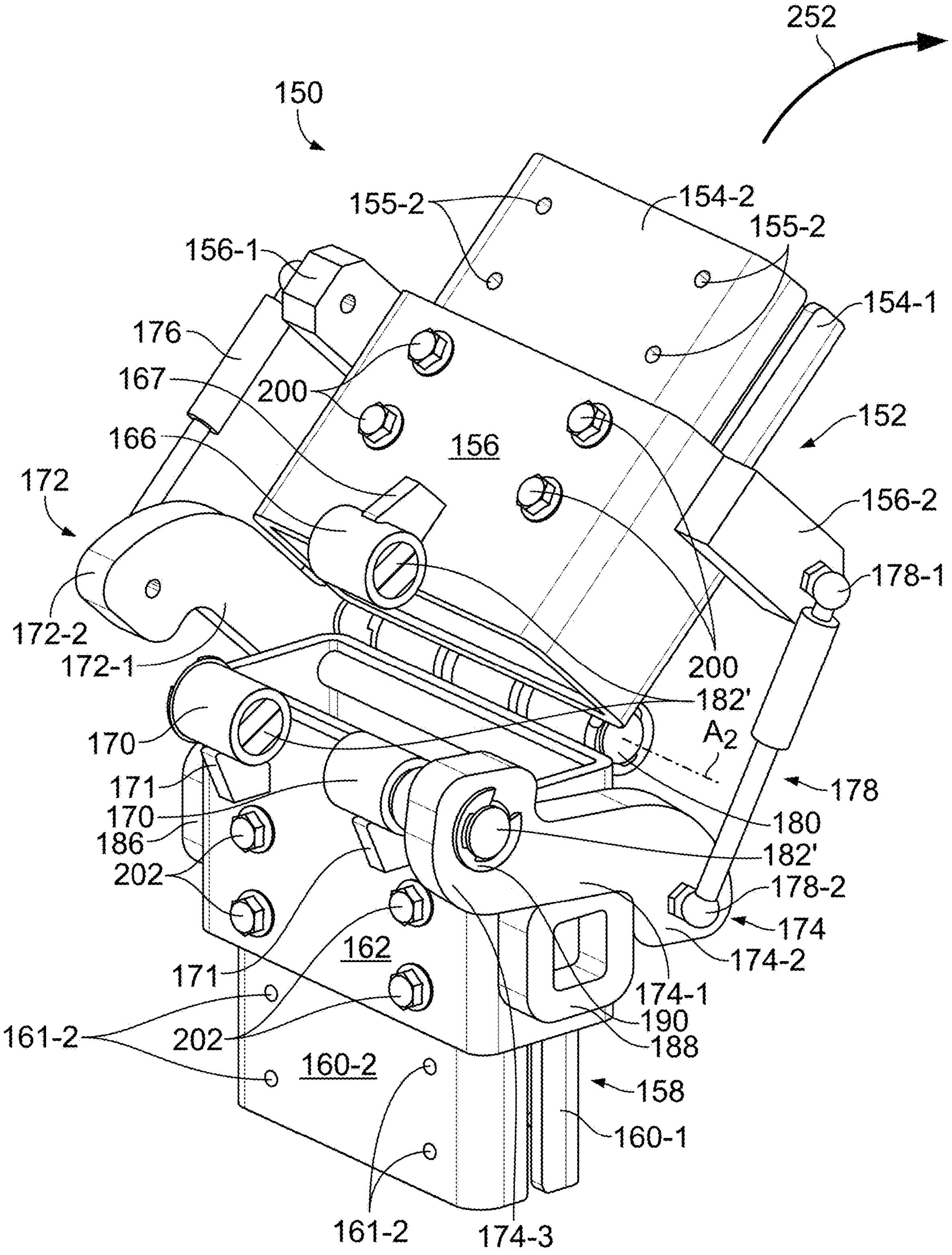
FIG. 13B is a detailed perspective view of the adapter illustrated in FIG. 13A.

As shown in FIG. 4, the first arm 172 may generally comprise a flattened "S" shape with a linear section 172-1, a first end 172-2 that extends away from the linear section 172-1 in a first direction, and a second end 172-3 that extends away from the linear section 172-1 in a second direction that is opposite to the first direction (see also FIG. 11). As best seen in FIGS. 12 and 13B, the second arm 174 may similarly comprise a flattened "S" shape with a linear section 174-1, a first end 174-2 that extends away from the linear section 174-1 in a first direction, and a second end 174-3 that extends away from the linear section 174-1 in a second direction that is opposite to the first direction.

With reference to FIGS. 3, 4, 11, and 12, the upper support body 156 comprises a first extension 156-1 that extends outward from the upper support body 156 in a first direction, and a second extension 156-2 that extends outward from the upper support body 156 in a second direction opposite the first direction. A first end 176-1 of the first gas spring 176 is coupled to the first extension 156-1, and a second end 176-2 of the first gas spring 176 is coupled to the first end 172-2 of the first arm 172, as shown in FIGS. 4 and 11. Hence, the first arm 172 is coupled to the upper support body 156 via the first gas spring 176, which is coupled to the first extension 156-1. A first end 178-1 of the second gas spring 178 is similarly coupled to the second extension 156-2, and a second end 178-2 of the second gas spring 178 is coupled to the first end 174-2 of the second arm 174, as shown in FIG. 12 (see also FIG. 13B). Hence, the second arm 174 is coupled to the upper support body 156 via the second gas spring 178, which is coupled to the second extension 156-2.

Figure 5:
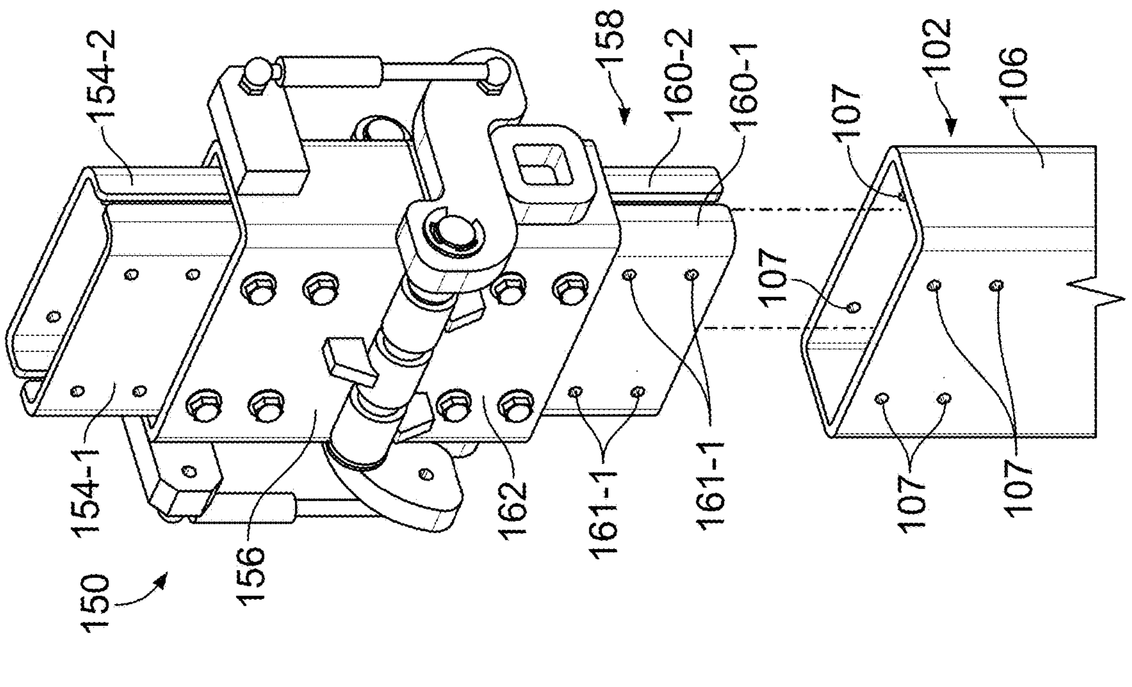

In the example shown in FIGS. 3-5, when the adapter 150 is in a normal operating position (i.e., prior to failure as described herein), the first and second gas springs 176, 178 may extend generally vertically between the respective first and second extensions 156-1, 156-2 and the first ends 172-2, 174-2 of the respective first and second arms 172, 174 and may be generally parallel to the main body 106 of the base mount 102. In other examples (not shown), the first and second gas springs 176, 178 may extend at an angle with respect to the main body 106 and the upper boom portion 104.

As shown in FIGS. 3, 11, 12, and 13B, the upper support body 156 comprises one hinge barrel 164 on one side and one hinge barrel 166 on the other side. The hinge barrel 164 may comprise a support bracket or gusset 163 extending between the hinge barrel 164 and an adjacent portion of the upper support body 156 to help support the hinge barrel 164. The hinge barrel 166 may similarly comprise a support bracket or gusset 167 extending between the hinge barrel 166 and an adjacent portion of the upper support body 156. The lower support body 162 comprises two hinge barrels 168 on one side and two hinge barrels 170 on the other side. Each hinge barrel 168 may comprise a support bracket or gusset 169 extending between the hinge barrels 168 and an adjacent portion of the lower support body 162. Each hinge barrel 170 may similarly comprise a support bracket or gusset 171 extending between the hinge barrel 170 and an adjacent portion of the lower support body 162.

The hinge barrels 164, 168 and an aperture formed in the second end 172-3 of the first arm 172 are aligned to receive the first pin 180, as shown in FIGS. 3 and 4, such that the first pin 180 couples the second end 172-3 of the first arm 172 to the upper and lower support bodies 156, 162 via the first pin 180 being received in the respective hinge barrels 164, 168 of the upper and lower support bodies 156, 162 and the aperture of the first arm 172. The hinge barrels 166, 170 and an aperture formed in the second end 174-3 of the second arm 174 are similarly aligned to receive the second pin 182, as shown in FIG. 12, such that the second pin 182 couples the second end 174-3 of the second arm 174 to the upper and lower support bodies 156, 162 via the second pin 182 being received in the hinge barrels 166, 170 of the upper and lower support bodies 156, 162 and the aperture of the second arm 174. One or more spacers 181 may be placed about the first pin 180 and between the first arm 172 and the adjacent hinge barrel 168 to maintain a desired spacing between the first arm 172 and the adjacent hinge barrel 168, as shown in FIG. 3. One or more spacers (not shown) may similarly be placed between the second arm 174 and the adjacent hinge barrel 170 (see FIG. 12). As shown in FIG. 4, one or more snap rings 184 may be placed around ends of the first pin 180 to hold the first pin 180 in place. One or more snap rings 190 may similarly be used to hold the second pin 182 in place, as best seen in FIG. 13B. The first and second pins 180, 182 may comprise shear pins that are configured to break or shear off upon application of a shear force equal to, or in excess of, a shear force threshold value, as described herein.

With continued reference to FIGS. 3, 4, 11, and 12, the lower support body 162 may comprise a first stop 186 and a second stop 188 extending outward from opposing sides of the lower support body 162. The first stop 186 may be positioned so that when the adapter 150 is in the normal, i.e., home, operating position as shown in FIG. 4, the linear section 172-1 of the first arm 172 rests against the first stop 186, and the linear section 174-1 (see FIG. 12) of the second arm 174 similarly rests against the second stop 188.

Figure 6:
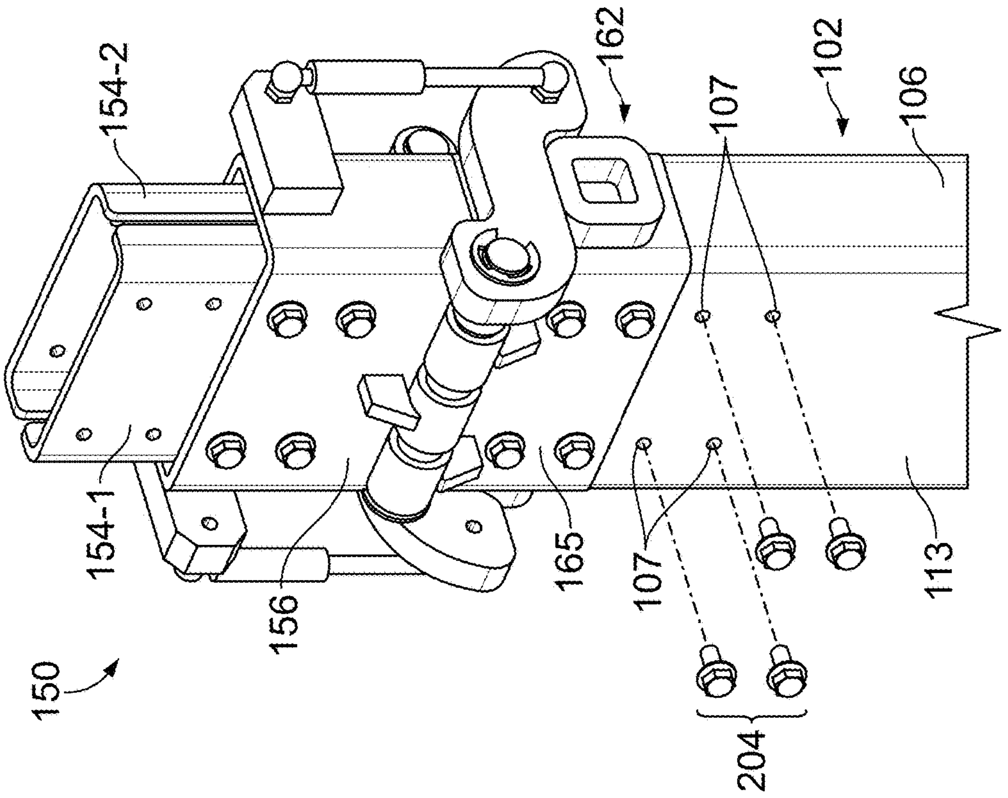
FIGS. 5-8 are partially exploded views of portions of the boom assembly and the adapter illustrated in FIG. 1.

As shown in FIGS. 5 and 6, the adapter 150 may be coupled to the main body 106 of the base mount 102. The main body 106 of the base mount 102 comprises a plurality of apertures 107 formed on both sides. In the example shown in FIG. 5, a front side of the main body 106 comprises four apertures 107. A back side of the main body 106 also comprises four apertures 107, although only a portion of the apertures 107 is visible. The lower engagement plates 160-1, 160-2 each comprise a plurality of corresponding threaded apertures 161-1, 161-2 (only the apertures 161-1 formed in the lower engagement plate 160-1 are visible in FIG. 5; see the apertures 161-2 formed in the lower engagement plate 160-2 in FIG. 13B). The lower engagement plates 160-1, 160-2 may be configured, i.e., sized and shaped, to fit and be received inside the main body 106 of the base mount 102. To secure the adapter 150, specifically the lower element 158 of the adapter 150, to the main body 106 of the base mount 102, the adapter 150 may be inserted into the base mount 102 so that the lower engagement plates 160-1, 160-2 are received in the main body 106, a lower surface of the lower support body 162 is seated against an upper surface of the main body 106, and the apertures 161 formed in the lower engagement plates 160-1, 160-2 are aligned with the apertures 107 formed in the main body 106. Fasteners 204 extend through the apertures 107 formed in the front side of the main body 106 and are received in the apertures 161 formed in the lower engagement plate 160-1. Although not visible in FIG. 6, fasteners 204 similarly extend through apertures formed in the back side of the main body 106 and are received in apertures formed in the lower engagement plate 160-2 (see FIG. 9). Upon installation of the adapter 150 into the main body 106 of the base mount 102, an outer surface 165 of the lower support body 162 may be flush with an outer surface 113 of the main body 106.

Figure 7:
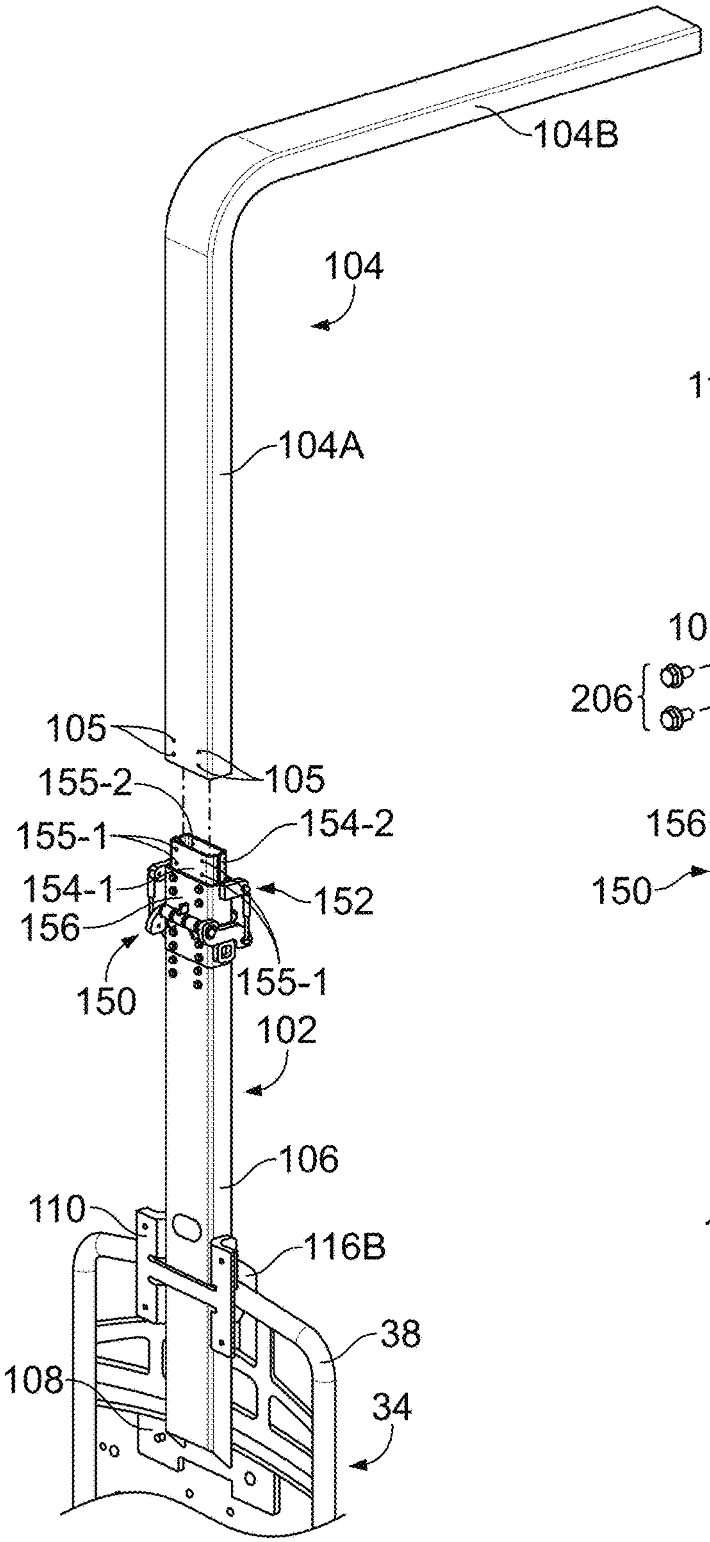
Figure 8:
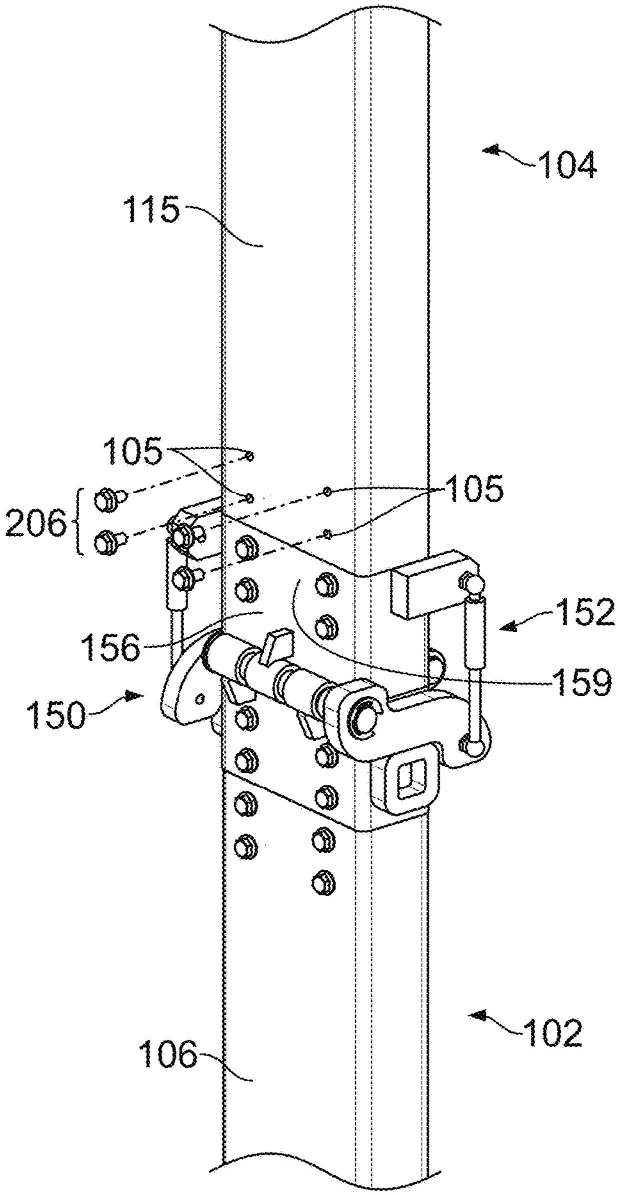

With reference to FIGS. 7 and 8, the upper boom portion 104 may be coupled to the adapter 150. In the example shown, the upper boom portion 104 is hollow and comprises a generally rectangular cross-section that corresponds to the cross-sectional shape of the base mount 102. In other examples, the upper boom portion 104 may comprise a different shape, such as a circular cross-sectional shape. The upper boom portion 104 may comprise a first section 104A and a second section 104B. In some examples, the second section 104B extends at an angle with respect to the first section 104A. In the example shown in FIGS. 7 and 14, the second section 104B extends substantially perpendicular, i.e., at an angle of about 90 degrees, +/−5 degrees, with respect to the first section 104A (see also FIG. 1). In other examples (not shown), the second section 104B may extend at an angle of +/−45 degrees from horizontal, e.g., parallel to a plane (not shown) defined by the operator's platform 32 and/or the forks 16. In further examples (not shown), the upper boom portion 104 may comprise a single section that extends generally vertically above the operator's platform 32. In the example shown in FIGS. 7 and 14, the first and second sections 104A, 104B may be substantially equal in length $L_1$, $L_2$. In other examples (not shown), the first section 104A may comprise a different length than the second section 104B. The main body 106 and the upper boom portion 104 may have a cross section with a width dimension ranging from 0.5 inch to 6.0 inches and a length dimension ranging from 0.5 inch to 6.0 inches. The main body 106 and the upper boom portion 104 may be made from any metal, such as a steel, stainless steel, aluminum, etc., and may have a wall thickness ranging from ⅛ inch to ¼ inch. An overall height of the boom assembly 100, i.e., the overall height of the boom assembly 100 above the forks 16 when the boom assembly 100 is installed, may range from 5.5 feet to 14 feet.

With continued reference to FIGS. 7 and 8, the upper boom portion 104, specifically the first section 104A, comprises a plurality of apertures 105 formed on both sides. In the example shown in FIG. 7, a front side of the upper boom portion 104 comprises four apertures 105. Although not visible, a back side of the upper boom portion 104 also comprises four apertures. The upper engagement plates 154-1, 154-2 each comprise a plurality of corresponding threaded apertures 155-1, 155-2 (only one of the apertures 155-2 formed in the upper engagement plate 154-2 is visible in FIG. 7; see also FIGS. 3 and 13B). The upper engagement plates 154-1, 154-2 may be configured, i.e., sized and shaped, to fit and be received inside the first section 104A of the upper boom portion 104. To secure the upper boom portion 104 to the adapter 150, specifically to the upper element 152 of the adapter 150, the first section 104A of the upper boom portion 104 may be placed over the upper element 152 of the adapter 150 and positioned so that the upper engagement plates 154-1, 154-2 are received in the first section 104A, a lower surface of the first section 104A is seated against an upper surface of the upper support body 156, and the apertures 155-1, 155-2 formed in the upper engagement plates 154-1, 154-2 are aligned with the apertures 105 formed in the upper boom portion 104. Fasteners 206 extend through the apertures 105 formed in the front side of the upper boom portion 104 and are received in the apertures 155-1 formed in the upper engagement plate 154-1. Although not visible in FIG. 8, fasteners 206 similarly extend through apertures formed in the back side of the upper boom portion 104 and are received in the apertures 155-2 formed in the upper engagement plate 154-2 (see FIG. 9). Upon installation of the upper boom portion 104 onto the adapter 150, an outer surface 159 of the upper support body 156 may be flush with an outer surface 115 of the upper boom portion 104.

Figure 9:
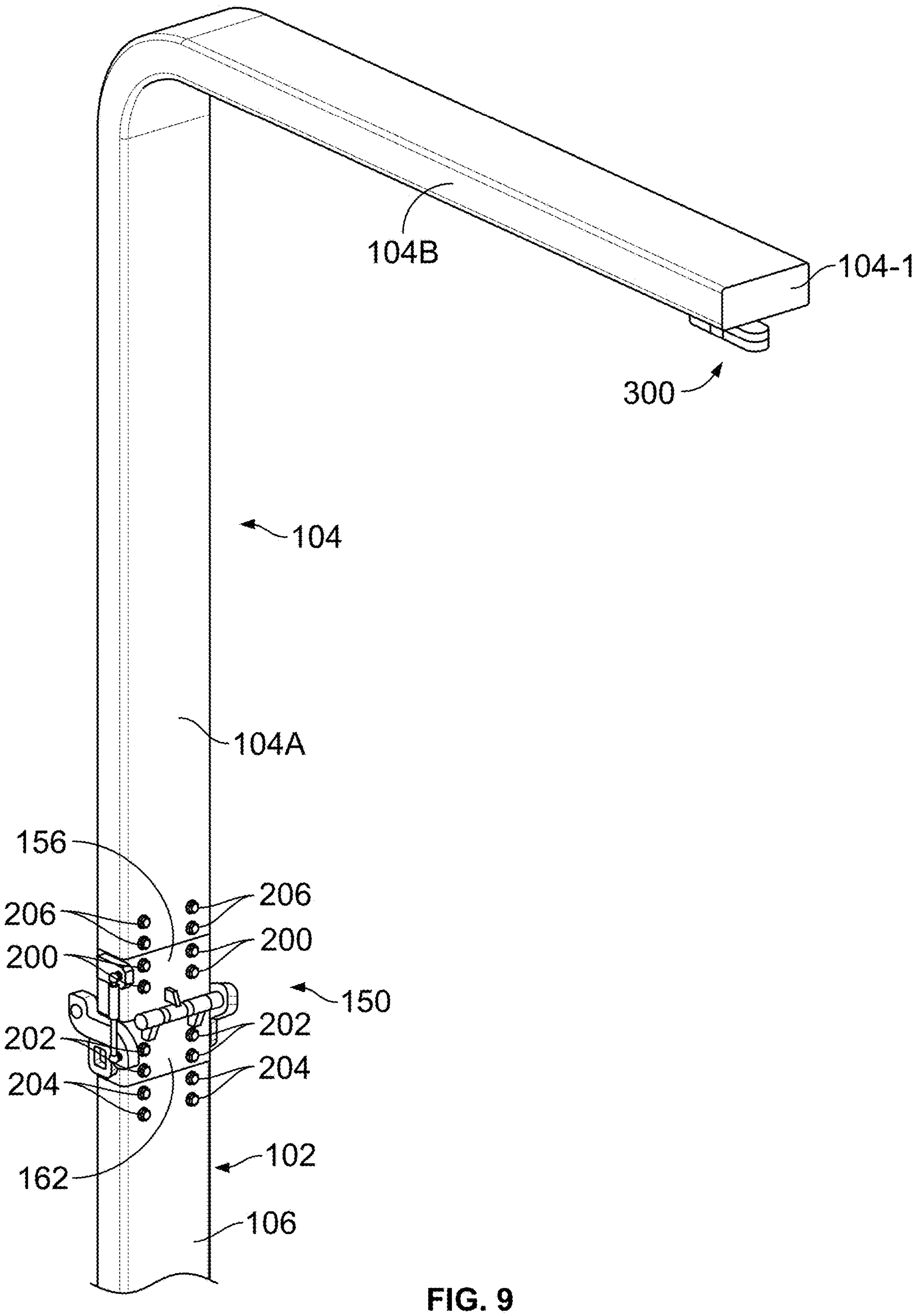
FIG. 9 is a detailed perspective view of the boom assembly and the adapter illustrated in FIG. 1.

In the example shown in FIGS. 1, 9, and 14, upon coupling of the upper boom portion 104 to the adapter 150, the first section 104A of the upper boom portion 104 extends generally vertically above the operator's platform 32 and is generally vertically aligned with the main body 106 of the base mount 102, e.g., aligned along a vertical axis v, as shown in FIG. 1. The second section 104B of the upper boom portion 104 may extend over, and generally parallel to, the forks 16 and perpendicular to the first section 104A and the main body 106 of the base mount 102.

With reference to FIGS. 1 and 9, the accessory 300 may be coupled to a distal end 104-1 of the upper boom portion 104 prior to, or after, coupling of the upper boom portion 104 to the adapter 150. The accessory 300 may be coupled to the distal end 104-1 of the upper boom portion 104 via any suitable attachment or attaching means (not shown), such as an adapter bracket, a threaded opening in the upper boom portion 104 that receives the accessory 300, etc. In some examples, the accessory 300 may be wireless and may comprise a battery or other power source. In other examples, wiring (not shown) may extend from the truck 10 through the boom assembly 100 to the accessory 300, e.g., to provide the accessory 300 with power and/or to send data to and receive data from the accessory 300.

As shown in FIG. 14, the length $L_1$ of the first section 104A of the upper boom portion 104 and/or a length $L_3$ of the main body 106 of the base mount 102 may be adjusted or configured as desired to place the accessory 300 at a desired vertical distance $D_1$ above the forks 16 so that the accessory 300 may perform the desired functions without interfering with the operator or loading of items on the forks 16. The length $L_2$ of the second section 104B of the upper boom portion 104 may also be adjusted or configured as desired to obtain a desired horizontal placement or positioning of the accessory 300, i.e., a distance $D_2$ between the operator's backrest 34 or the load backrest 20 and the accessory 300. In particular, the location of the main body 106 and the upper boom portion 104 and/or the length $L_2$ of the second section 104B may be configured to position the accessory 300: (i) generally centered over the forks 16, (ii) laterally along axis c so as to be near or directly over one of the forks 16, and/or (iii) outside of the load handling/fork area. In some examples, the accessory 300 may be a camera. A pallet (not shown) may be placed on the forks 16, and the boom assembly 100 may position the camera above and over the forks 16 so that the camera may monitor and track items that are loaded onto the pallet. In other examples, the accessory 300 may be an image projecting device, and the boom assembly 100 may position the image projecting device above and over the forks 16 so that the device may project an image at a desired location on the forks 16 or a pallet placed on the forks 16.

Figure 10:
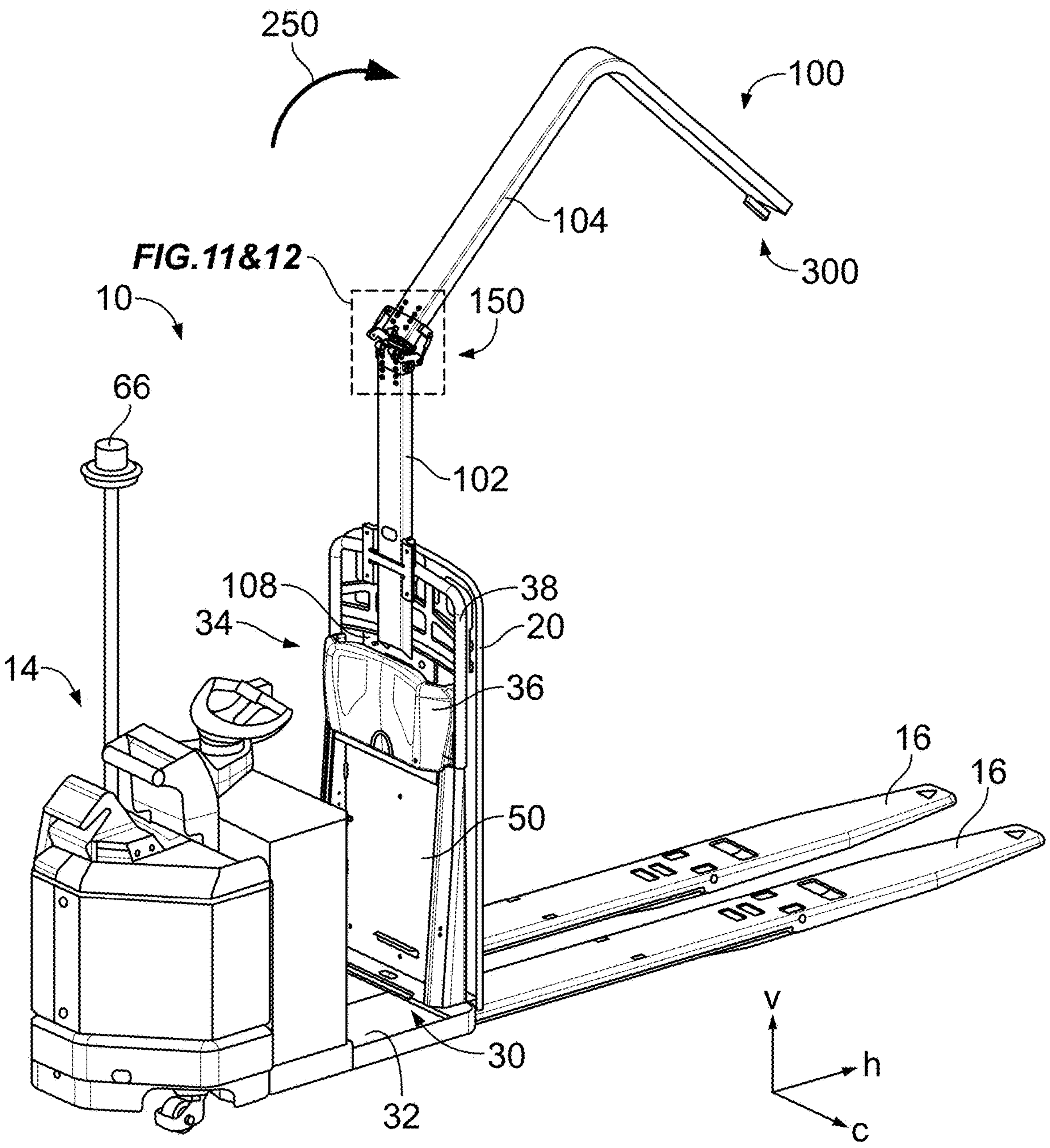
FIG. 10 is a perspective view of a materials handling vehicle comprising a boom assembly with an adapter in a first shear state, in accordance with the present disclosure.
Figure 15:
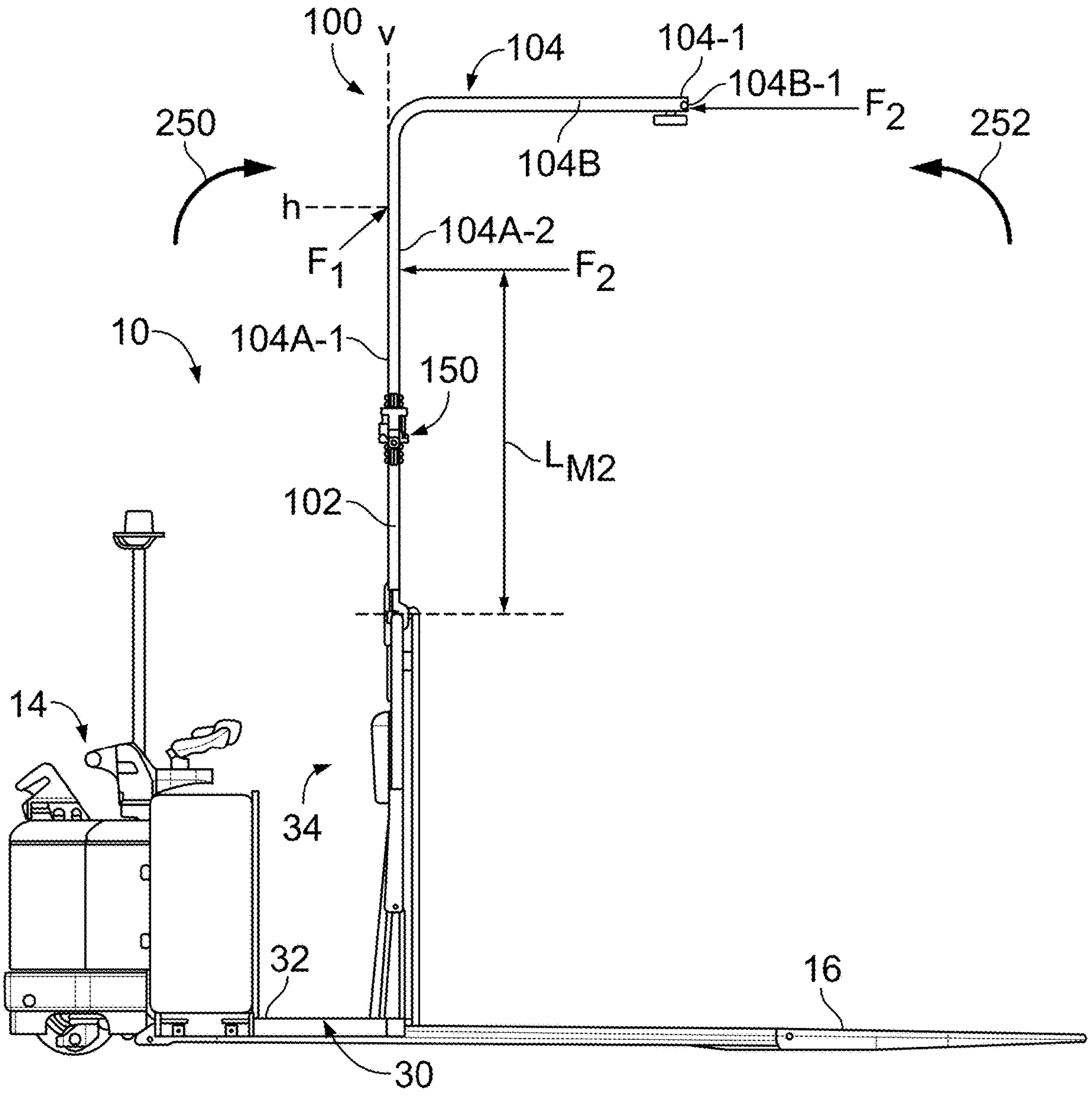

Because the boom assembly 100 may extend generally vertically above the operator's platform 32 and generally horizontally over the forks 16, the boom assembly 100 is subjected to a variety of standard application forces during normal operation of the truck 10, including acceleration, braking, turning, and loading/unloading. The boom assembly 100 may be subjected to additional forces, such as when the boom assembly 100 collides with an object (e.g., an overhead object, a falling object, etc. (not shown)) and/or the truck 10 collides with another object, such as another truck, a rack, etc. (not shown). With reference to FIG. 15, when the upper boom portion 104 collides with an object, the boom assembly 100 may be subjected to forces directly incident on the upper boom portion 104 at any angle, such as exemplary external force $F_1$ or force $F_2$ (see FIG. 15). The external forces $F_1$, $F_2$ may have force components coincident or parallel with a horizontal axis h, a vertical axis v, and/or an out-of-plane axis c, which axes are shown in FIGS. 10 and 13A.

For example, as shown in FIG. 15, the external force $F_1$ may be caused by an object engaging/striking a first wall 104A-1 of the first section 104A of the upper boom portion 104, which first wall 104A-1 faces away from the forks 16. The force $F_1$ may strike the first wall 104A-1 at an angle, such that the force $F_1$ may have horizontal and vertical force components, as indicated by line h and line v, respectively. This force $F_1$ may cause the boom assembly 100 to bend in a bending direction 250 toward the forks 16 (also referred to herein as a first bending direction; see also FIG. 10).

Alternatively, with continued reference to FIG. 15, the upper boom portion 104 may be subjected to a different external force, such as the force $F_2$, caused by an object acting on a second wall 104A-2 of the first section 104A of the upper boom portion 104, which second wall 104A-2 faces toward the forks 16, and/or acting on a wall 104B-1 of the second section 104B of the upper boom portion 104, which wall 104B-1 is adjacent to the distal end 104-1 of the upper boom portion 104 and extends substantially parallel to the second wall 104A-2. The force $F_2$ may comprise a normal force acting on the second wall 104A-2 of the first section 104A of the upper boom portion 104. This force $F_2$ may cause the boom assembly 100 to bend in a bending direction 252 toward the power unit 14 (also referred to herein as a second direction; see also FIG. 13A).

Without the adapter 150 in accordance with the present disclosure, these external forces $F_1$ or $F_2$ may generate stresses on the boom assembly 100, the operator's backrest 34, and other components of the truck 10 that may cause damage or failure in structural integrity, such as permanent deformation, cracking, shearing, or other type(s) of failure. The adapter 150 is configured to maintain the boom assembly 100 in a normal (e.g., upright) operating position, as shown in FIGS. 1 and 15, when the upper boom portion 104 is subjected to standard application forces during normal operation of the truck 10, which were noted above, i.e., when the upper boom portion 104 is subjected to one or more external forces causing one or more internal forces in the adapter 150 that are below the yield force threshold of the adapter 150. The adapter 150 is further configured to yield or fail in a controlled manner, as shown in FIGS. 10 and 13A, when the upper boom portion 104 is subjected to one or more external forces causing one or more internal forces in the adapter 150 equal to, or in excess of, the yield force threshold of the adapter 150. The yield force threshold of the adapter 150 may be designed so that the adapter 150 yields or fails before one or more external forces applied to the upper boom portion 104 cause stresses in the operator's backrest 34 sufficient to result in damage or failure in the structural integrity of the operator's backrest 34.

When a force, such as exemplary force $F_2$ illustrated in FIG. 15, acts on the second wall 104A-2, a moment $M_2$ of the force $F_2$ equals a magnitude of the force $F_2$ (i.e., its component parallel to the horizontal axis h; see FIG. 13A) times a length $L_{M2}$ extending from where the force $F_2$ impacts or is applied to the second wall 104A-2 to a location anywhere on the operator's backrest 34 (as the base mount 102 is coupled to the operator's backrest 34), such as where the second flange 110 (not visible in FIG. 15; see FIGS. 2 and 10) is coupled to the operator's backrest 34. The operator's backrest 34 will experience substantial bending stress from the moment $M_2$. A geometry of, and material used for, the main body 106 of the base mount 102 and upper boom portion 104 are generally selected so that the main body 106 and the upper boom portion 104 have a high section modulus to withstand impact forces. Hence, when a force, such as force $F_2$, acts on the boom assembly 100, stresses on the boom assembly 100 and the operator's backrest 34 resulting from the force $F_2$ and its corresponding moment $M_2$ are more likely to cause damage to the structural integrity of the operator's backrest 34 than the boom assembly 100. Hence, a yield force threshold for failure of the operator's backrest 34 will be determined, which may be used to determine a yield force threshold, i.e., a shear force threshold, for each of the first and second pins 180, 182 of the adapter 150 (the pins 180, 182 are not labeled in FIG. 15; see FIGS. 3 and 12).

Figure 16:
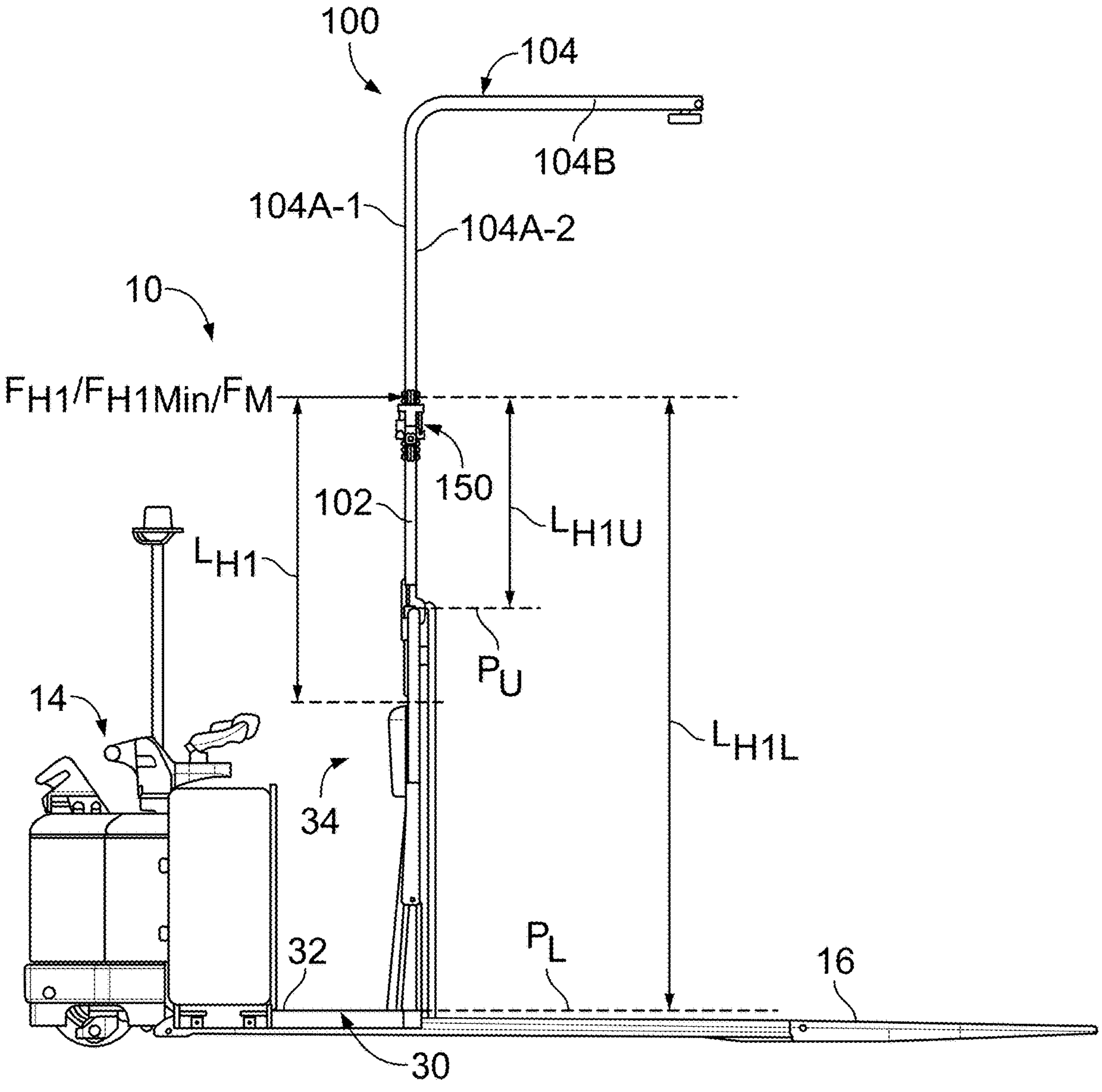
Figure 17:
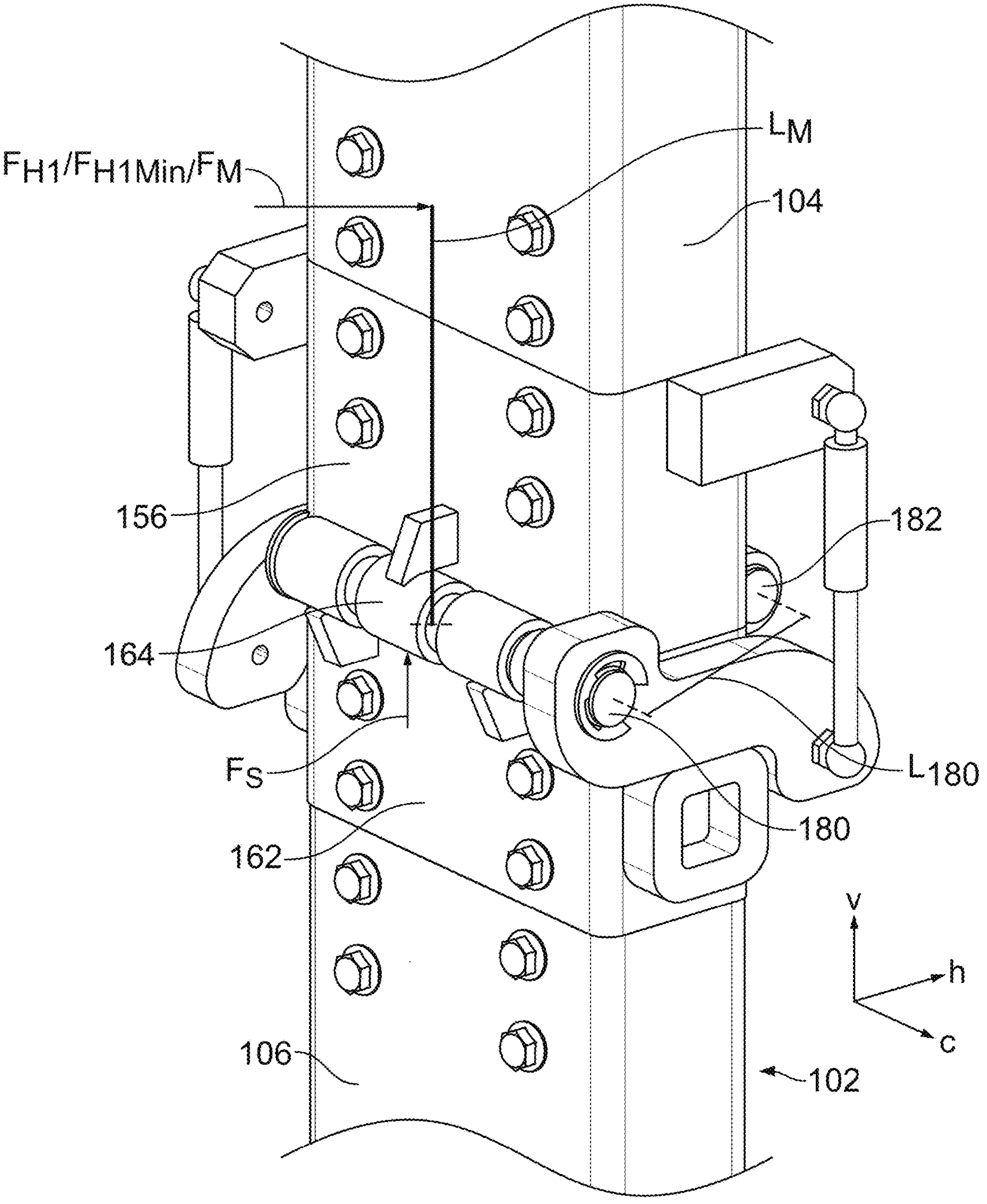
FIG. 17 is a perspective view of an adapter in accordance with the present disclosure.

With reference to FIGS. 16 and 17, it is presumed that a force Fin is applied at a height above the forks 16 and the operator's platform 32, see FIG. 16, which height is slightly above an operator height $H_2$ for a $95^{th}$ percentile adult male, see FIG. 14. An internal moment $M_{H1}$ from the force $F_{H1}$ is developed within the operator's backrest 34, which equals a magnitude of the force $F_{H1}$ (i.e., its component parallel to the horizontal axis h) times a length $L_{H1}$ extending from where the force $F_{H1}$ impacts or is applied to the upper boom portion 104 to a given location on the operator's backrest 34, which given location on the operator's backrest 34 may extend from a lowermost point $P_L$ on the operator's backrest 34 to an uppermost point $P_U$ on the operator's backrest 34.

A bending stress at the operator's backrest 34 resulting from moment $M_{H1}$ is given by the following Equation (1):

$$\sigma = M_{H1}/Z$$

where $\sigma$ = bending stress;

$M_{H1}$ = moment;

and $Z$ = section modulus based on a geometry of the operator's backrest 34.

Equation (1) may be solved for various values of moment $M_{H1i}$, wherein i=1 . . . n, wherein each moment $M_{H1i}$ has a corresponding moment arm defined by a length $L_{H1i}$, wherein i=1 . . . n, in which $L_{H1i}$ may be any length extending from where the force $F_{H1}$ impacts or is applied to the upper boom portion 104 to an end point at or between the lowermost point $P_L$ of the operator's backrest 34 (illustrated as $L_{H1L}$ in FIG. 16) and the uppermost point $P_U$ of the operator's backrest 34 (illustrated as $L_{H1U}$ in FIG. 16). Bending stress $\sigma$ may be set equal to a yield strength of the material from which the operator's backrest 34 is formed, such as a specific grade of steel from which the operator's backrest 34 is formed. Yield strengths for such materials are well known. The section modulus Z can be calculated from the geometry of the operator's backrest 34 and may vary with height depending on backrest geometry, as section modulus Z may change along a height of the operator's backrest 34, i.e., a section modulus Z calculated for a backrest horizontal plane taken at one point along the height of the operator's backrest 34 may vary from a section modulus Z calculated for a backrest horizontal plane taken at a different point along the height of the operator's backrest 34. That is, the section modulus Z may have one value when the moment arm defined by the length $L_{1L}$ has an end point positioned at the lowermost point $P_L$ of the operator's backrest 34, as the cross-section of the geometry at the lowermost point $P_L$ of the operator's backrest 34 will be used when calculating the section modulus Z, and the section modulus Z may have another value when the moment arm defined by the length $L_{H1U}$ has an end point positioned at the uppermost point $P_U$ of the operator's backrest 34, as the cross-section of the geometry at the uppermost point $P_U$ of the operator's backrest 34 will be used when calculating the section modulus Z, which may differ from the cross-section taken at the lowermost point $P_L$, of the operator's backrest 34. Setting the bending stress $\sigma$ equal to the yield strength of the material from which the operator's backrest 34 is formed allows a moment Mini at each determined section modulus Z to be calculated that would result in the structural integrity of the operator's backrest 34 being damaged, see Equation (1) above. Each section modulus Z may be located at a different height along the operator's backrest 34 such that each calculated moment $M_{M1i}$ with a different, corresponding section modulus Z may have a different moment arm or length $L_{H1i}$. The yield strength also defines a yield force threshold for the operator's backrest 34. In other words, the force $F_{H1}$ resulting in the moment $M_{H1}$ will create stresses in the operator's backrest 34 equal to the yield force threshold for the operator's backrest 34, resulting in structural integrity damage to the operator's backrest 34.

The moment Mini having the lowest value from all values of the moment $M_{H1i}$ calculated, which equals the smallest moment $M_{H1i}$ to cause damage to the operator's backrest 34, is designated as a minimum moment value $M_{H1Min}$. Once the minimum moment $M_{H1Min}$ is known, a magnitude of a corresponding force $F_{H1Min}$ may be determined, which force $F_{H1Min}$ is likely to cause structural integrity damage to the operator's backrest 34. The force $F_{H1Min}$ may be determined by dividing the moment $M_{H1Min}$ by a length corresponding to moment $M_{H1Min}$, e.g., the length corresponding to the section modulus Z corresponding to and from which moment $M_{H1Min}$ was determined. It is desirable to have each of the first and second pins 180, 182 (not shown in FIG. 16; see FIG. 17) fail prior to structural integrity damage occurring at the operator's backrest 34. Hence, the force $F_{H1Min}$ may be multiplied by a safety factor, such as 0.5 or any other value desired to calculate a modified force $F_M$.

As illustrated in FIGS. 16 and 17, the force $F_{H1Min}$ is applied to a section of the upper boom portion 104 overlapping or overlying one of the upper engagement plates 154-1, which location where the force $F_{H1Min}$ is applied is spaced a distance from the first pin 180 equal to length $L_M$. Using the modified force $F_M$ instead of the force $F_{H1Min}$, a moment $M_{FM}$ of the modified force $F_M$ about the first pin 180 equals a magnitude of the modified force $F_M$ (i.e., its component parallel to the horizontal axis h) times the length $L_M$ extending from where the modified force $F_M$ impacts or is applied to the upper boom portion 104/upper engagement plate 154-1 to a location of the first pin 180.

Application of the modified force $F_M$ causes an internal shear force $F_S$ to be applied by the hinge barrel 164 coupled to the upper support body 156 sufficient to shear the first pin 180. A moment $M_S$ of the shear force $F_S$ about the second pin 182 equals the magnitude of the shear force $F_S$ times a length $L_{180}$ extending from where the force $F_S$ impacts or is applied to the first pin 180 to a location of the second pin 182 about which the sheer force $F_S$ will rotate.

$M_{FM}$ and $M_S$ are set equal to one another, resulting in the following Equation (2):

$$F_S = (F_M * L_M) / L_{180}$$

Shear strength V for each of the first and second pins 180, 182 and a cross-sectional area $A_{PIN}$ for each of the first and second pins 180, 182 may be determined using the following Equation (3):

$$F_S = V * A_{PIN}$$

Values of shear strength V for various materials are well known. Various combinations of shear strength V and cross-sectional area $A_{PIN}$ for each of the first and second pins 180, 182 may be substituted into Equation (3). Shear force $F_S$ sufficient to shear the first or the second pin 180, 182 is known from solving Equation (2) and is referred to herein as: (i) a shear force threshold for each of the first and second pins 180, 182; and (ii) the yield force threshold for the adapter 150. Preferably, a large cross-sectional area $A_{PIN}$ is selected for the first and second pins 180, 182 to account for degrading effects of repeated application-induced stresses or fatigue at the first and second pins 180, 182. Hence, the shear force threshold for each of the first and the second pin 180, 182 separately or the yield force threshold for the adapter 150 is designed so that the first and second pins 180, 182 fail prior to structural integrity damage occurring at the operator's backrest 34.

It is further contemplated that the shear force threshold for each of the first and second pins 180, 182 may be determined via experimentation using actual boom assemblies (e.g., by applying one or more external forces to actual boom assemblies to determine a desired internal shear force threshold, such that the first and second pin 180, 182 fail prior to structural integrity damage occurring at the operator's backrest 34) and/or via one or more suitable computer modelling techniques.

With reference to FIGS. 10-12 and 15, the upper boom portion 104 (not shown in FIG. 12) may be subjected to an external impact force, i.e., exemplary force $F_1$, at an angle to the first wall 104A-1 of the upper boom portion 104 and generally extending toward the forks 16. When a horizontal component of the external force $F_1$ (indicated by line h) creates one or more internal forces within the adapter 150 equal to or in excess of the yield force threshold of the adapter 150, the adapter 150 yields or fails, and the upper element 152 of the adapter 150, along with the upper boom portion 104 coupled thereto, are displaced toward the forks 16 (referred to herein as a first shear state). The yield force threshold of the adapter 150 may equal the shear force threshold for each of the first and the second pins 180, 182.

As the upper element 152 begins to displace or bend due to the external force $F_1$ acting on the first wall 104A-1 of the upper boom portion 104, the hinge barrel 164 coupled to the upper support body 156 exerts an internal shear force on the first pin 180 due to the upper support body 156 bending or rotating with the upper boom portion 104 (see also FIG. 17). The first pin 180 may be a shear pin that is comprised of one or more materials and may have a structure/geometry, such that the first pin 180 (also referred to herein as a first shear pin) has a shear force threshold or yield force threshold, as discussed above. The first pin 180 may resist rotation of the upper element 152 in the first bending direction 250, and prior to breaking, the first pin 180 may absorb at least a portion of the energy resulting from the impact and displacement of the upper boom portion 104. When the upper boom portion 104 is subjected to the external force $F_1$ having a sufficient magnitude to cause one or more internal forces in the adapter 150 to equal or exceed the yield force threshold of the adapter 150, i.e., the external force $F_1$ on the upper boom portion 104 causes the hinge barrel 164 to create an internal shear force on the first pin 180 equal to or in excess of the shear force threshold or yield force threshold of the first pin 180, the first pin 180 is caused to break or be sheared apart and fail, as indicated by broken pin 180' in FIG. 11. The first pin 180 may break at a location(s) positioned adjacent to the hinge barrel 164. Thus, the first pin 180 fails before one or more external forces applied to the upper boom portion 104 cause damage to, or failure of, the structural integrity of the operator's backrest 34.

As shown in FIGS. 11 and 12, after the first pin 180 breaks, the upper element 152 rotates relative to the lower element 158 about an axis $A_1$ of the second pin 182 in the first bending direction 250 toward the forks 16. The first gas spring 176 acts as a dampener and provides resistance to rotation of the upper element 152 in the first bending direction 250. As the first extension 156-1 rotates with the upper support body 156, the first arm 172 is held in place by (i) engagement between the linear section 172-1 and the first stop 186; and (ii) a remaining portion of the broken pin 180' in engagement with one of the hinge barrels 168 and the aperture of the first arm 172, causing the first gas spring 176 to be compressed between the first extension 156-1 and the first end 172-2 of the first arm 172. Fluid, such as a gas comprising air, within a cylinder (not labeled) of the first gas spring 176 resists the compression caused by a piston or ram moving into the cylinder, such that the first gas spring 176 absorbs at least a portion of the energy resulting from the impact and displacement of the upper boom portion 104. The first gas spring 176 helps to slow and eventually stop the motion of the upper boom portion 104 and helps to control deflection of the upper boom portion 104 when the boom assembly 100 enters the first shear state. The amount of resistance provided by the first gas spring 176 may be selected as desired depending upon the type, size, etc. of gas spring provided.

When the upper element 152 moves in the first bending direction 250, the second extension 156-2 also rotates with the upper support body 156, and the second arm 174 and the second gas spring 178 rotate freely about the axis $A_1$ of the second pin 182, in which the second pin 182 remains intact. As shown in FIG. 12, the linear section 174-1 of the second arm 174 disengages and moves away from the second stop 188. The adapter 150 is configured such that the upper boom portion 104 remains connected to the base mount 102 after the first pin 180 fails. In particular, the upper element 152, and the upper boom portion 104 coupled thereto, remain connected or attached to the lower element 158 via the second gas spring 178, the second arm 174, and the second pin 182 in engagement with the respective hinge barrels 166, 170 of the upper and lower support bodies 156, 162, thereby preventing or minimizing damage to the truck 10, the base mount 102 and the upper boom portion 104, the accessory 300, and/or adjacent personnel or objects.

As shown in FIGS. 13A, 13B, and 15, the upper boom portion 104 (not shown in FIG. 13B) may be subjected to an external impact force, i.e., exemplary force $F_2$, in a direction generally toward the power unit 14. When the force $F_2$ acting on the upper boom portion 104 creates one or more internal forces within the adapter 150 equal to or in excess of the yield force threshold of the adapter 150, the adapter 150 yields or fails, causing the upper element 152 of the adapter 150, along with the upper boom portion 104 coupled thereto, to be displaced toward the power unit 14 (referred to herein as a second shear state).

As the upper element 152 begins to displace or bend due to the external force $F_2$, the hinge barrel 166 coupled to the upper support body 156 exerts an internal shear force on the second pin 182 due to the upper support body 156 bending or rotating with the upper boom portion 104. The second pin 182 may comprise a shear pin, and as described above with respect to the first pin 180 in FIGS. 11 and 12, the second pin 182 (also referred to herein as a second shear pin) may have a shear force threshold or yield force threshold, see Equations (2) and (3), determined by the one or more materials comprising the second pin 182 and/or a structure/geometry of the second pin 182. The second pin 182 may resist rotation of the upper element 152 in the second bending direction 252, and prior to breaking, the second pin 182 may absorb at least a portion of the energy resulting from the impact and displacement of the upper boom portion 104. When the upper boom portion 104 is subjected to the external force $F_2$ having a sufficient magnitude to cause one or more internal forces in the adapter 150 to equal or exceed the yield force threshold of the adapter 150, i.e., the external force $F_2$ acting on the upper boom portion 104 causes the hinge barrel 166 to create an internal shear force on the second pin 182 equal to or in excess of the shear force threshold or yield force threshold of the second pin 182, the second pin 182 is caused to break or be sheared apart and fail, as indicated by broken pin 182' in FIG. 13B. The second pin 182 may break at a location(s) positioned adjacent to the hinge barrel 170. Thus, the second pin 182 fails before one or more external forces applied to the upper boom portion 104 cause damage to, or failure of, the structural integrity of the operator's backrest 34.

After the second pin 182 breaks, the upper element 152 then rotates relative to the lower element 158 about an axis $A_2$ of the first pin 180 in the second bending direction 252 toward the power unit 14. As described above with respect to the first gas spring 176, the second gas spring 178 acts as a dampener and provides resistance to rotation of the upper element 152 in the second bending direction 252. As the second extension 156-2 rotates with the upper support body 156, the second arm 174 is held in place by (i) engagement between the linear section 174-1 and the second stop 188; and (ii) a remaining portion of the broken pin 182' in engagement with one of the hinge barrels 170 and the aperture of the second arm 174, causing the second gas spring 178 to be compressed between the second extension 156-2 and the first end 174-2 of the second arm 174. Fluid, such as a gas comprising air, within a cylinder (not labeled) of the first gas spring 176 resists the compression caused by a piston or ram moving into the cylinder, such that the second gas spring 178 absorbs at least a portion of the energy resulting from the impact and displacement of the upper boom portion 104. The second gas spring 178 helps to slow and eventually stop the motion of the upper boom portion 104 and helps to control deflection of the upper boom portion 104 of the boom assembly 100 when the boom assembly 100 enters the second shear state. The amount of resistance provided by the second gas spring 178 may be selected as desired depending upon the type, size, etc. of gas spring provided.

When the upper element 152 moves in the second bending direction 252, the first extension 156-1 also rotates with the upper support body 156, and the first arm 172 and the second gas spring 178 rotate freely about the axis $A_2$ of the first pin 180, in which the second pin 182 remains intact. As shown in FIG. 13B, the linear section 172-1 of the first arm 172 disengages and moves away from the first stop 186. The adapter 150 is configured such that the upper boom portion 104 remains connected to the base mount 102 after the second pin 182 fails. In particular, the upper element 152, and the upper boom portion 104 coupled thereto, remain attached to the lower element 158 via the first gas spring 176, the first arm 172, and the first pin 180, thereby preventing or minimizing damage to the truck 10, the base mount 102 and upper boom portion 104, the accessory 300, and/or adjacent personnel or objects.

With reference to FIGS. 4 and 14, the length $L_3$ of the main body 106 of the base mount 102 may be adjusted or configured to place or locate a junction 151 between the upper and lower elements 152, 158 of the adapter 150 at a desired height $H_1$ above the forks 16 and the operator's platform 32. The height $H_1$ may be based in part on the operator height $H_2$ for a $95^{th}$ percentile adult male. In particular, the height $H_1$ may be greater than the operator height $H_2$ to ensure that the adapter 150 is located high enough above the operator that the upper boom portion 104 does not contact the operator upon failure of the adapter 150. For example, the operator height $H_2$ may be 75 inches, and the height $H_1$ may be 84 inches.

As shown in FIG. 10, positioning the junction 151 between the upper and lower elements 152, 158 of the adapter 150 at the height $H_1$ may also help to prevent damage to the truck 10, the boom assembly 100, the accessory 300, and/or adjacent personnel and objects by ensuring that when the adapter 150 enters the first or second shear state, the upper boom portion 104 remains clear of the rest of the truck 10, including, for example, the antenna 66, the forks 16, and/or a load positioned on the forks 16, and remains clear of adjacent objects and personnel. As shown in FIGS. 10 and 14, the upper boom portion 104 may deflect relative to the base mount 102, i.e., relative to the vertical axis v, in the first bending direction 250 toward the forks 16 by an angle $\alpha_1$, in which the angle $\alpha_1$ is greater than 0 degrees and up to about 90 degrees. As shown in FIGS. 13A and 14, the upper boom portion 104 may deflect relative to the base mount 102, i.e., relative to the vertical axis v, in the second bending direction 252 toward the power unit 14 by an angle $\alpha_2$, in which the angle $\alpha_2$ is greater than 0 degree and up to about 90 degrees. In the examples shown in FIGS. 10 and 13A where the boom assembly 100 is depicted in the first and second shear states, respectively, the upper boom portion 104 is illustrated as being deflected at an angle of approximately 45 degrees with respect to the base mount 102.

The adapter 150 and the components thereof may be modular or interchangeable, such that upon failure, the entire adapter 150, or one or more components thereof, may be removed and replaced and the boom assembly 100 may be reassembled. For example, with reference to FIG. 11, the broken pin 180' may be removed and replaced with a new pin. If the damage is more extensive, the entire adapter 150 may be replaced by removing the fasteners 204, 206 (see FIGS. 6, 8, and 9) securing the upper and lower engagement plates 154-1, 154-2 and 160-1, 160-2 to the base mount 102 and the upper boom portion 104, removing the adapter 150 from the boom assembly 100, and replacing the damaged adapter 150 with a new adapter. Because the adapter 150 yields to impact forces applied to the boom assembly 100, the adapter 150 may help to prevent damage to the base mount 102, the upper boom portion 104, and/or the accessory 300, thereby reducing the cost of replacement, preventing or minimizing the need to repair the truck 10, and reducing the amount of down time before the truck 10 can resume normal operations.

While particular examples of the present disclosure have been illustrated and described, it would be obvious to those skilled in the art that various other changes and modifications can be made without departing from the spirit and scope of the present disclosure. It is therefore intended to cover in the appended claims all such changes and modifications that are within the scope of the present disclosure.

What is claimed is:

1. A boom assembly comprising:

an upper boom portion;

a base mount; and an adapter coupling the base mount to the upper boom portion, wherein the adapter is configured to (i) maintain the boom assembly in a normal operating position when the upper boom portion is subjected to one or more external forces causing one or more internal forces in the adapter below a yield force threshold of the adapter; and (ii) yield when the upper boom portion is subjected to one or more external forces causing one or more internal forces in the adapter equal to or in excess of the yield force threshold of the adapter, wherein the adapter comprises an upper element coupled to the upper boom portion, a lower element coupled to the base mount, a first shear pin, a second shear pin, a first gas spring, and a second gas spring, wherein:

when the upper boom portion is subjected to one or more external forces having a force component extending in a first direction causing one or more internal forces in the adapter equal to or in excess of the yield force threshold, the first shear pin breaks and allows the upper element to rotate in a first bending direction, and the first gas spring provides resistance to rotation of the upper element in the first bending direction; and when the upper boom portion is subjected to one or more external forces having a force component extending in a second direction opposite to the first direction causing one or more internal forces in the adapter equal to or in excess of the yield force threshold, the second shear pin breaks and allows the upper element to rotate in a second bending direction, and the second gas spring provides resistance to rotation of the upper element in the second bending direction.

2. The boom assembly of claim 1, wherein the adapter is configured such that the upper boom portion remains connected to the base mount after the first shear pin fails or the second shear pin fails.

3. The boom assembly of claim 1, wherein the upper element comprises a first extension and a second extension and the adapter further comprises a first arm and a second arm, wherein a first end of the first gas spring is coupled to the first extension and a second end of the first gas spring is coupled to a first end of the first arm, and wherein a first end of the second gas spring is coupled to the second extension and a second end of the second gas spring is coupled to a first end of the second arm.

4. The boom assembly of claim 3, wherein the upper element further comprises a first stop and a second stop, and wherein when the boom assembly is in the normal operating position, a linear section of the first arm rests against the first stop and a linear section of the second arm rests against the second stop.

5. The boom assembly of claim 1, wherein:

the upper element comprises a pair of upper engagement plates that are received in an upper support body, the upper engagement plates being configured to be received in the upper boom portion to secure the upper boom portion to the upper element; and the lower element comprises a pair of lower engagement plates that are received in a lower support body, and the lower engagement plates being configured to be received in the base mount to secure the lower element to the base mount.

6. The boom assembly of claim 1, wherein:

when the upper element rotates in the first direction, the boom assembly is in a first shear state, and when the upper element rotates in the second direction, the boom assembly is in a second shear state;

the adapter is configured to hold the upper boom portion at a fixed position relative to the base mount when the boom assembly is in the first or the second shear state.

7. The boom assembly of claim 6, wherein when the boom assembly is in the first or the second shear state, the upper boom portion deflects relative to a vertical axis in the first or the second bending direction by an angle of greater than 0 degrees and up to 90 degrees.

8. A materials handling vehicle comprising:

a power unit;

a load handling assembly extending from the power unit and comprising a pair of forks;

an operator's station comprising an operator's backrest and an operator's platform; and a boom assembly associated with the materials handling vehicle, wherein the boom assembly comprises a base mount, an upper boom portion, and an adapter coupling the base mount to the upper boom portion, wherein the base mount comprises a main body extending generally vertically above the operator's platform, wherein the upper boom portion comprises a first section extending generally vertically above the operator's platform, wherein the adapter is configured to (i) maintain the boom assembly in a normal operating position when the upper boom portion is subjected to one or more external forces causing one or more internal forces in the adapter below a yield force threshold of the adapter; and (ii) yield when the upper boom portion is subjected to one or more external forces causing one or more internal forces in the adapter equal to or in excess of the yield force threshold of the adapter, and wherein the adapter comprises an upper element coupled to the upper boom portion, a lower element coupled to the base mount, a first shear pin, a second shear pin, a first gas spring, and a second gas spring, wherein:

when the upper boom portion is subjected to one or more external forces having a force component extending in a first direction causing one or more internal forces in the adapter equal to or in excess of the yield force threshold, the first shear pin breaks and allows the upper element to rotate in a first bending direction, and the first gas spring provides resistance to rotation of the upper element in the first bending direction; and when the upper boom portion is subjected to one or more external forces having a force component extending in a second direction opposite to the first direction causing one or more internal forces in the adapter equal to or in excess of the yield force threshold, the second shear pin breaks and allows the upper element to rotate in a second bending direction, and the second gas spring provides resistance to rotation of the upper element in the second bending direction.

9. The materials handling vehicle of claim 8, wherein the adapter is configured such that the upper boom portion remains connected to the base mount after the first shear pin fails or the second shear pin fails.

10. The materials handling vehicle of claim 8, wherein the upper element comprises a first extension and a second extension and the adapter further comprises a first arm and a second arm, wherein a first end of the first gas spring is coupled to the first extension and a second end of the first gas spring is coupled to a first end of the first arm, and wherein a first end of the second gas spring is coupled to the second extension and a second end of the second gas spring is coupled to a first end of the second arm.

11. The materials handling vehicle of claim 10, wherein a length of the main body of the base mount is configured so that a junction between the upper and lower elements of the adapter is located a first height above the operator's platform, wherein the first height is greater than an operator height for a 95th percentile adult male.

12. The materials handling vehicle of claim 8, further comprising an accessory coupled to a distal end of the upper boom portion.

13. The materials handling vehicle of claim 12, wherein the upper boom portion comprises a second section extending over the forks perpendicular to the first section, and wherein a length of the second section of the upper boom portion is configured to position the accessory over the forks.

14. The materials handling vehicle of claim 12, wherein the accessory comprises a camera.

15. The materials handling vehicle of claim 8, wherein the boom assembly is coupled to the operator's backrest.

16. The materials handling vehicle of claim 8, wherein:

when the upper element rotates in the first direction, the boom assembly is in a first shear state, and when the upper element rotates in the second direction, the boom assembly is in a second shear state;

the adapter is configured to hold the upper boom portion at a fixed position relative to the base mount when the boom assembly is in the first or the second shear state.

17. The materials handling vehicle of claim 16, wherein when the boom assembly is in the first or the second shear state, the upper boom portion deflects relative to a vertical axis in the first or the second bending direction by an angle of greater than 0 degrees and up to 90 degrees.

* * * * *